US009152779B2

(12) United States Patent
Fiske

(10) Patent No.: US 9,152,779 B2
(45) Date of Patent: Oct. 6, 2015

(54) PROTECTING CODES, KEYS AND USER CREDENTIALS WITH IDENTITY AND PATTERNS

(75) Inventor: Michael Stephen Fiske, San Francisco, CA (US)

(73) Assignee: Michael Stephen Fiske, San Francisco, CA (US)

(*) Notice: Subject to any disclaimer, the term of this patent is extended or adjusted under 35 U.S.C. 154(b) by 0 days.

(21) Appl. No.: 13/344,795

(22) Filed: Jan. 6, 2012

(65) Prior Publication Data

US 2012/0185698 A1 Jul. 19, 2012

Related U.S. Application Data

(60) Provisional application No. 61/461,479, filed on Jan. 16, 2011, provisional application No. 61/461,455, filed on Jan. 18, 2011.

(51) Int. Cl.
*G06F 21/00* (2013.01)
*G06F 21/32* (2013.01)
*G06Q 20/40* (2012.01)
*H04L 9/30* (2006.01)
(Continued)

(52) U.S. Cl.
CPC .......... *G06F 21/32* (2013.01); *G06Q 20/40145* (2013.01); *H04L 9/3066* (2013.01); *H04L 9/3231* (2013.01); *H04L 63/08* (2013.01); *H04L 63/0861* (2013.01); *G06F 2221/2107* (2013.01); *G06F 2221/2149* (2013.01); *H04L 2209/56* (2013.01); *H04L 2209/805* (2013.01); *Y04S 40/24* (2013.01); *Y04S 50/12* (2013.01)

(58) Field of Classification Search
CPC ............ G06F 21/32; G06F 2221/2149; G06F 2221/2107; G06Q 20/40145; H04L 9/3066; H04L 9/3231; H04L 63/08; H04L 2209/56; H04L 2209/805; H04L 63/0861; Y04S 40/24; Y04S 50/12
USPC ........................................................ 713/186
See application file for complete search history.

(56) References Cited

U.S. PATENT DOCUMENTS 3,950,733 A 4/1976 Cooper et al.
4,555,796 A 11/1985 Sakoe
4,961,005 A 10/1990 Salam
(Continued)

FOREIGN PATENT DOCUMENTS

EP 1 280 094 A2 1/2003
EP 1 865 442 A2 12/2007
(Continued)

*Primary Examiner* — Kambiz Zand
*Assistant Examiner* — Aubrey Wyszynski
(74) *Attorney, Agent, or Firm* — David Lewis

(57) ABSTRACT

Machine and method of accessing information securely are disclosed. Two sets of user identifying data are acquired. A transformation is established by mapping of one set of data onto another set of data or onto itself. An invariant is generated from the transformation of the user identifying data. An authentication key is generated using the invariant. In an embodiment, the invariant is a relationship between two objects that remains static under transformations between the two objects. In an embodiment, the invariant is a cryptography key. In an embodiment, the transformation(s) help perform an authentication of the user and are executed by digital computer program instructions. In an embodiment, pattern transformation(s) are represented with colors, geometry, or frequencies.

70 Claims, 17 Drawing Sheets

(51) Int. Cl.
*H04L 9/32* (2006.01)
*H04L 29/06* (2006.01)

(56) References Cited

U.S. PATENT DOCUMENTS

| | | | |
|---|---|---|---|
| 5,060,263 A | 10/1991 | Bosen et al. | |
| 5,148,514 A | 9/1992 | Arima et al. | |
| 5,216,752 A | 6/1993 | Tam | |
| 5,303,328 A | 4/1994 | Masui et al. | |
| 5,325,464 A | 6/1994 | Pechanek et al. | |
| 5,343,554 A | 8/1994 | Koza et al. | |
| 5,402,492 A | 3/1995 | Goodman et al. | |
| 5,479,570 A | 12/1995 | Imagawa et al. | |
| 5,481,644 A | 1/1996 | Inazumi | |
| 5,481,672 A | 1/1996 | Okuno et al. | |
| 5,604,801 A | 2/1997 | Dolan et al. | |
| 5,612,683 A | 3/1997 | Trempala et al. | |
| 5,623,548 A | 4/1997 | Akiyama et al. | |
| 5,659,626 A | 8/1997 | Ort et al. | |
| 5,724,425 A | 3/1998 | Chang et al. | |
| 5,768,382 A | 6/1998 | Schneier et al. | |
| 5,799,098 A | 8/1998 | Ort et al. | |
| 5,802,199 A | 9/1998 | Pare, Jr. et al. | |
| 5,809,143 A | 9/1998 | Hughes | |
| 5,825,880 A | 10/1998 | Sudia et al. | |
| 5,832,466 A | 11/1998 | Feldgajer | |
| 5,848,403 A | 12/1998 | Gabriner et al. | |
| 5,887,140 A | 3/1999 | Itsumi et al. | |
| 5,903,225 A | 5/1999 | Schmitt et al. | |
| 5,920,642 A | 7/1999 | Merjanian | |
| 5,923,756 A | 7/1999 | Shambroom | |
| 5,926,555 A | 7/1999 | Ort et al. | |
| 5,930,780 A | 7/1999 | Hughes et al. | |
| 5,933,516 A | 8/1999 | Tu et al. | |
| 5,940,825 A | 8/1999 | Castelli et al. | |
| 6,169,771 B1 | 1/2001 | Shou et al. | |
| 6,256,619 B1 | 7/2001 | Grichnik | |
| 6,260,031 B1 | 7/2001 | Schaffer et al. | |
| 6,292,586 B1 | 9/2001 | Kawakami et al. | |
| 6,341,372 B1 | 1/2002 | Datig | |
| 6,470,261 B1 | 10/2002 | Ng et al. | |
| 6,493,686 B1 | 12/2002 | Francone et al. | |
| 6,532,541 B1 * | 3/2003 | Chang et al. | 713/176 |
| 6,601,053 B1 | 7/2003 | Schaffer et al. | |
| 6,651,049 B1 | 11/2003 | Agrawal et al. | |
| 6,704,757 B1 | 3/2004 | Ohmi et al. | |
| 6,751,621 B1 | 6/2004 | Calistri-Yeh et al. | |
| 6,810,118 B1 | 10/2004 | Martin | |
| 6,868,525 B1 | 3/2005 | Szabo | |
| 6,928,368 B1 | 8/2005 | Bulla, Jr. et al. | |
| 6,934,938 B2 | 8/2005 | May et al. | |
| 6,950,696 B2 | 9/2005 | Björling et al. | |
| 7,162,032 B2 | 1/2007 | Brekne | |
| 7,623,468 B2 | 11/2009 | Panigrahy et al. | |
| 2002/0038294 A1 | 3/2002 | Matsugu | |
| 2002/0059154 A1 | 5/2002 | Rodvold | |
| 2003/0183878 A1 | 10/2003 | Tajiri et al. | |
| 2003/0212645 A1 | 11/2003 | Schaffer et al. | |
| 2004/0162795 A1 | 8/2004 | Dougherty et al. | |
| 2005/0075702 A1 | 4/2005 | Shafer | |
| 2006/0236226 A1 | 10/2006 | Meijer et al. | |
| 2006/0245225 A1 | 11/2006 | Vorbach | |
| 2007/0014394 A1 | 1/2007 | Harder et al. | |
| 2007/0061777 A1 | 3/2007 | Vashi et al. | |
| 2007/0245154 A1 * | 10/2007 | Akkermans et al. | 713/186 |
| 2008/0178002 A1 * | 7/2008 | Hirata et al. | 713/168 |
| 2010/0199092 A1 * | 8/2010 | Andrus et al. | 713/171 |
| 2010/0322485 A1 * | 12/2010 | Riddiford | 382/115 |

FOREIGN PATENT DOCUMENTS

| | | |
|---|---|---|
| WO | WO 2006/055767 A2 | 5/2006 |
| WO | WO 2008/010773 A1 | 1/2008 |
| WO | WO 2012/097362 A2 | 7/2012 |

* cited by examiner transformation from the top region to
the bottom region is a translation of (-83, -764) and
a rotation of 30 degrees

COMMUTATIVE DIAGRAM OF TRANSFORMATION MAPS

"T" IS A TRANSFORMATION FROM FINGERS TO FINGERS $T(e_1) = P_1$ $T(e_2) = P_2$ $T(e_3) = P_3$ $T(e_4) = P_4$ $T(e_5) = P_5$

"T" IS A TRANSFORMATION BETWEEN HAND TEMPLATES $T(e_1) = P_1$ $T(e_2) = P_2$ $T(e_3) = P_3$ $T(e_4) = P_4$ $T(e_5) = P_5$ $T(e_6) = P_6$ $T(e_7) = P_7$

A transformation between color patterns

COLOR NUMBER MAP:

H: HORIZONTAL RULE SET

FIGURE 15

V: VERTICAL RULE SET

| 0 2 | 0 4 | 0 5 | 0 8 | 0 9 | 0 12 |
| 1 2 | 1 4 | 1 5 | 1 8 | 1 9 | 1 12 |
| 2 2 | 2 4 | 2 5 | 2 8 | 2 9 | 2 12 |

3 10   3 11

4 10   4 11

5 10   5 11

6 0   6 1   6 3

7 0   7 1   7 3

8 0   8 1   8 3

| 9 2 | 9 4 | 9 5 | 9 8 | 9 9 | 9 12 |
| 10 2 | 10 4 | 10 5 | 10 8 | 10 9 | 10 12 |
| 11 2 | 11 4 | 11 5 | 11 8 | 11 9 | 11 12 |

12 6   12 7

PROTECTING CODES, KEYS AND USER CREDENTIALS WITH IDENTITY AND PATTERNS

RELATED APPLICATIONS

This application claims priority benefit of U.S. Provisional Patent Application Ser. No. 61/461,479, entitled "Protecting Codes, Keys and User Credentials with External Identity," filed Jan. 16, 2011, which is incorporated herein by reference. This application claims priority benefit of U.S. Provisional Patent Application Ser. No. 61/461,455, entitled "Protecting Codes, Keys and User Credentials with External Identity and Hidden Information," filed Jan. 18, 2011, which is incorporated herein by reference.

FIELD

The specification generally relates to biometrics, cryptography and cybersecurity used to secure financial transactions, financial information, healthcare information, and infrastructure such as satellites, financial exchanges, the Internet, electrical grid, power plants and defense systems. The specification relates to machines, methods and systems that secure and support this infrastructure and execute transactions.

BRIEF DESCRIPTION OF THE FIGURES

In the following figures, although they may depict various examples of the invention, the invention is not limited to the examples depicted in the figures.

Figure 6:
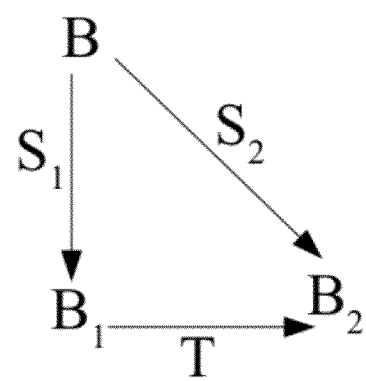
FIG. 6 shows a commutative diagram of transformations. T, $S_1$ and $S_2$ are transformations. Commutative means that these transformations satisfy the relationship $S_2 = T \circ S_1$ or $S_2 \approx T \circ S_1$. The symbol $\circ$ denotes the composition of the transformation $S_1$ followed by the transformation T. The symbol $\approx$ means that $S_2$ and $T \circ S_1$ are equal or close to being the same. When $S_1$ is invertible [in other words $(S_1)^{-1}$ exists, then $S_2 \circ (S_1)^{-1}$ measures the transformation difference.

In regard to FIG. 6, B, $B_1$ and $B_2$ are biometric prints in some embodiments. In some embodiments, B, $B_1$ and $B_2$ are biometric templates. In some embodiments, B, $B_1$ and $B_2$ are patterns distinct from biometric prints or biometric templates.

Figure 7:
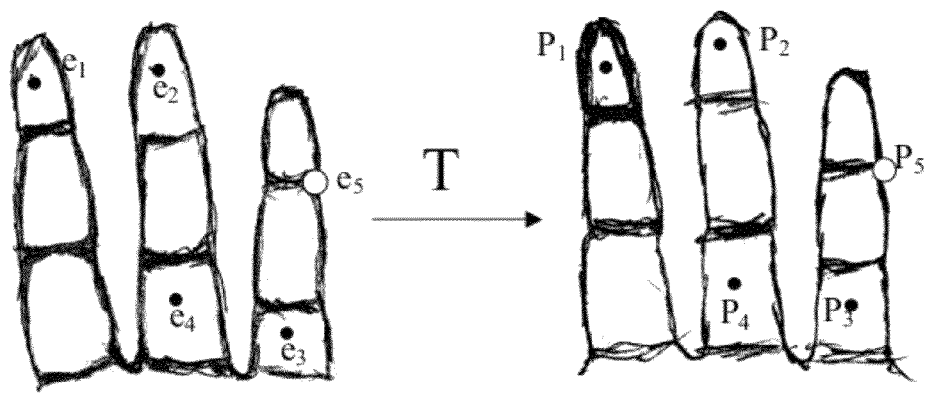

FIG. 7 shows a transformation from fingers to fingers.

Figure 8:
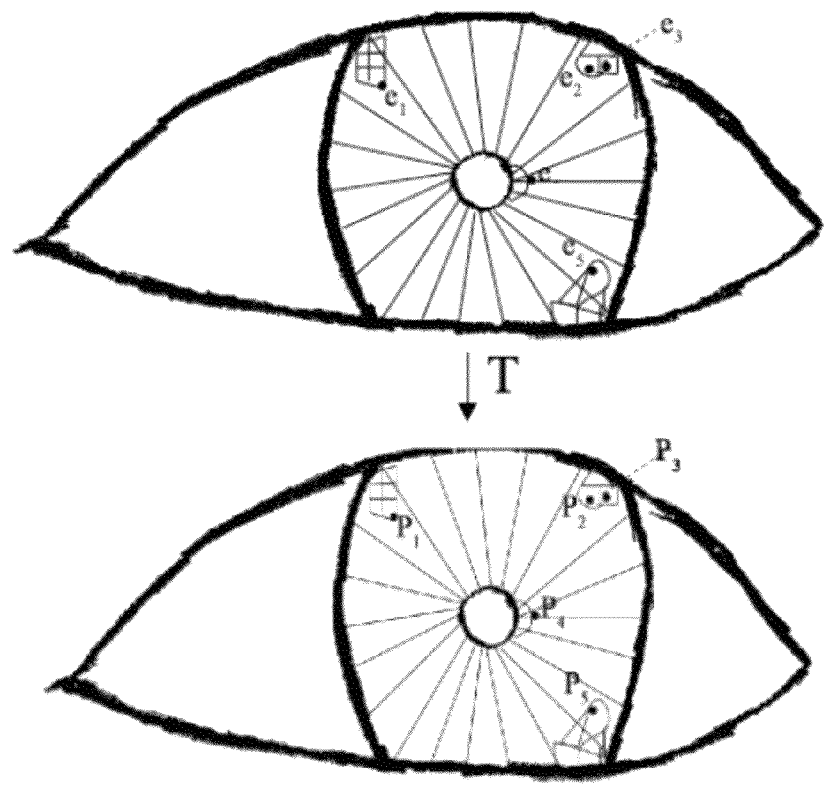

FIG. 8 shows a transformation from an iris template to an iris template.

Figure 9:
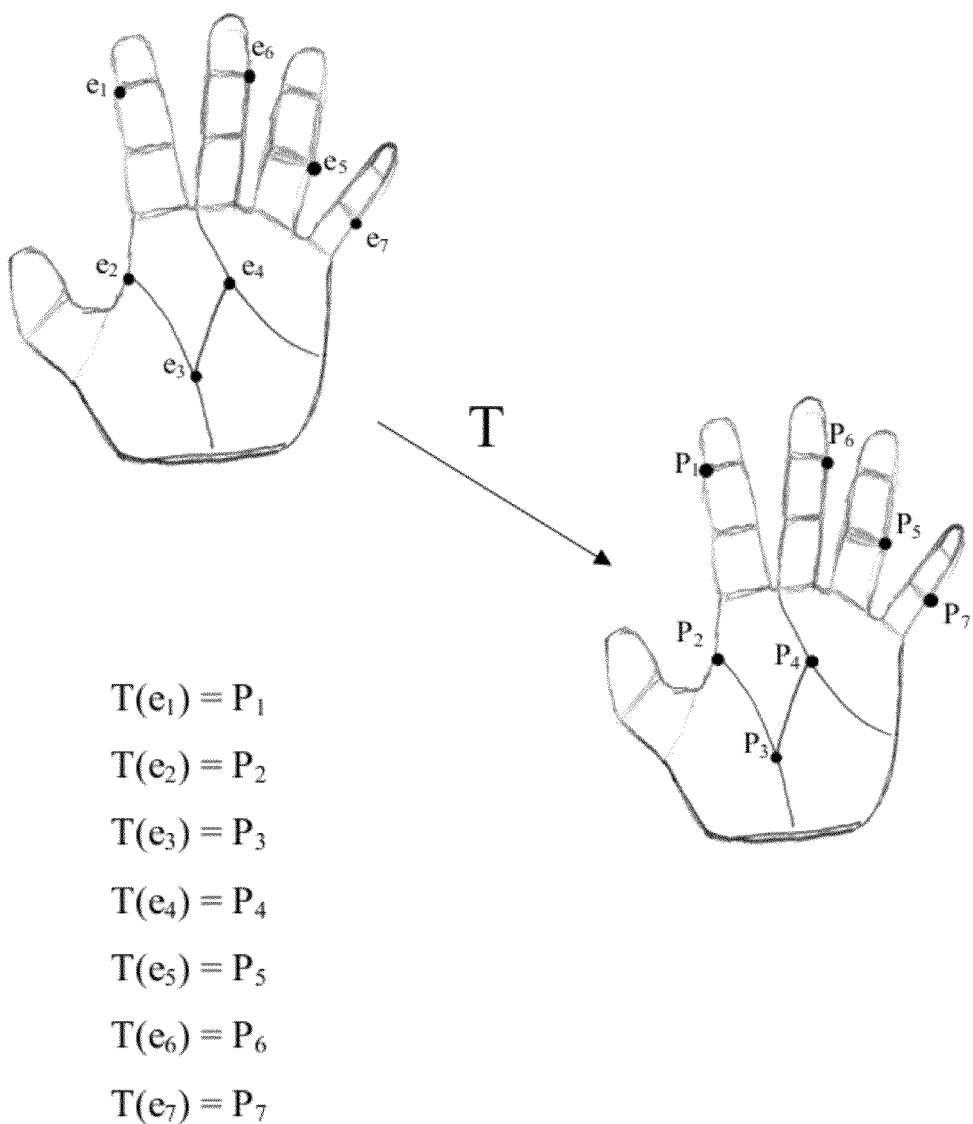

FIG. 9 shows a transformation from a hand print to a hand print.

Figure 10:
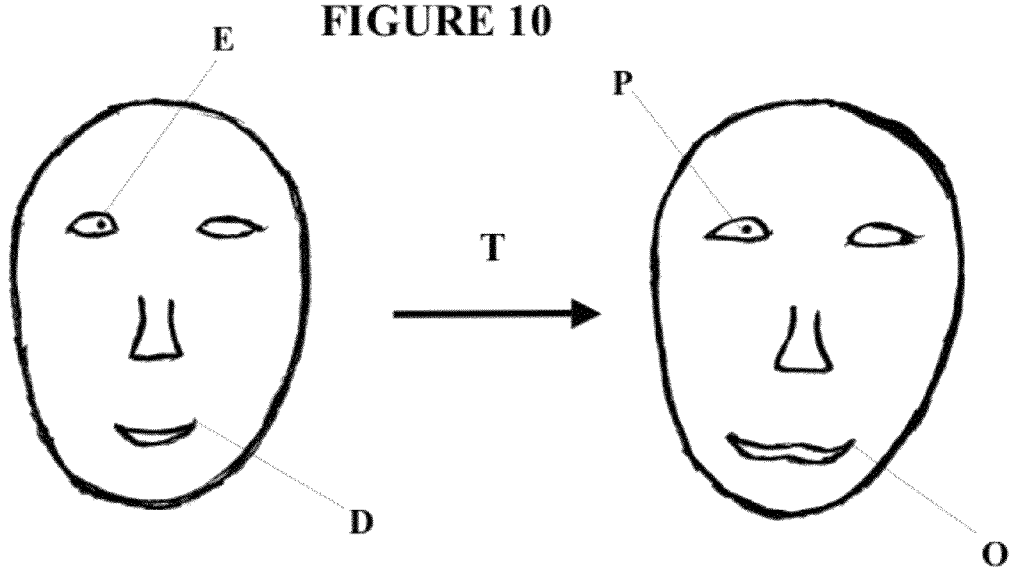

FIG. 10 shows a transformation between two face templates.

Figure 11:
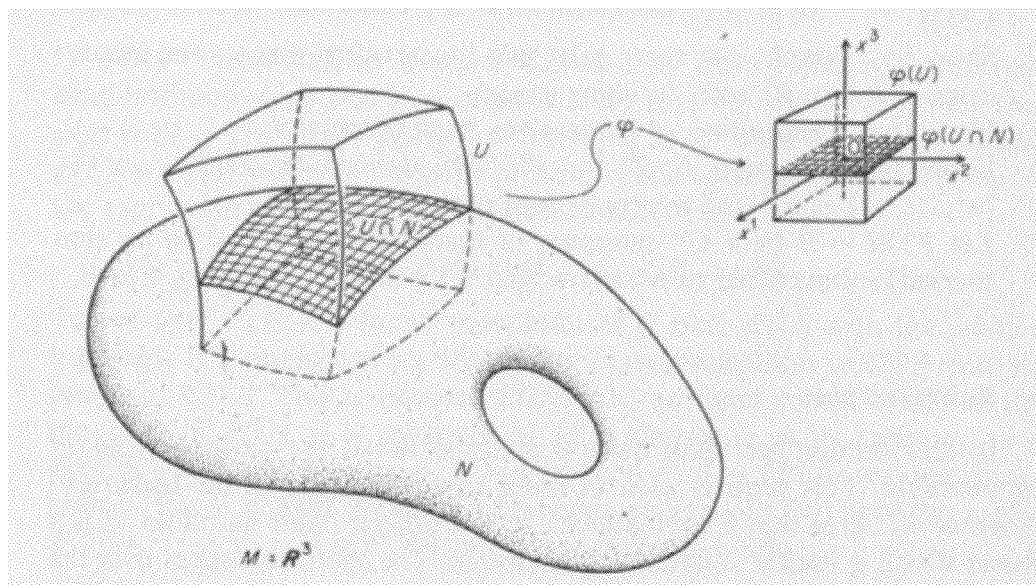
Figure 11:
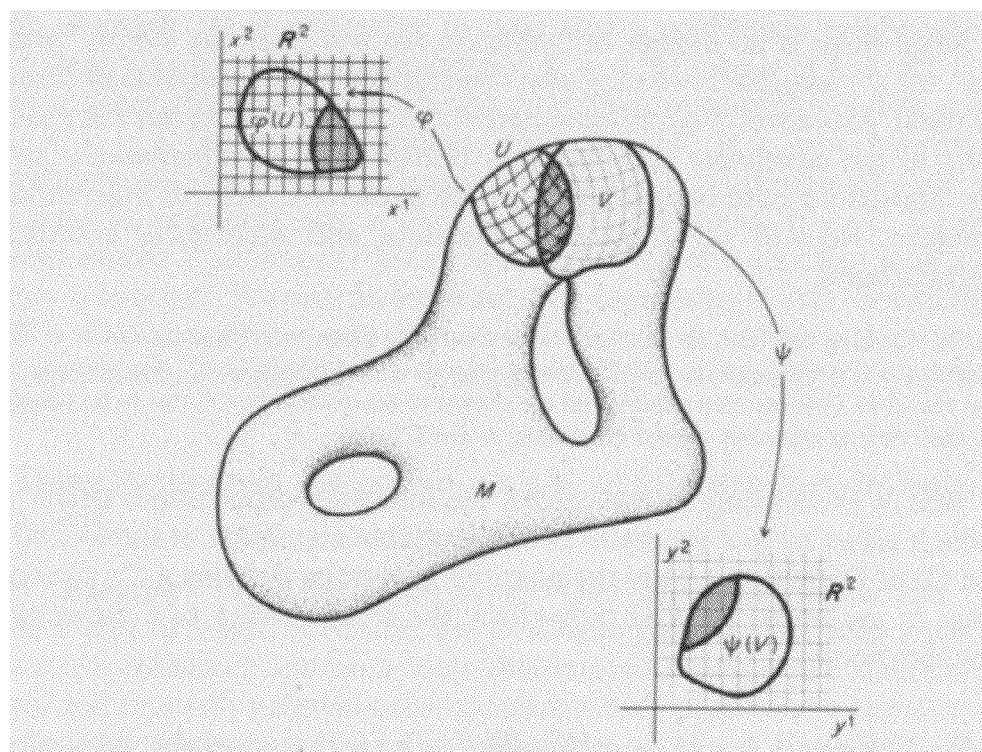

FIG. 11 shows two examples of diffeomorphisms. In some embodiments, a transformation may be a diffeomorphishm.

Figure 12:
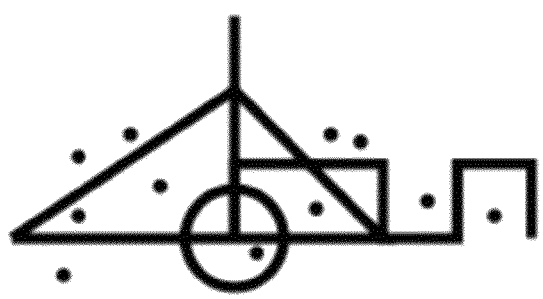
Figure 12:
Figure 12:
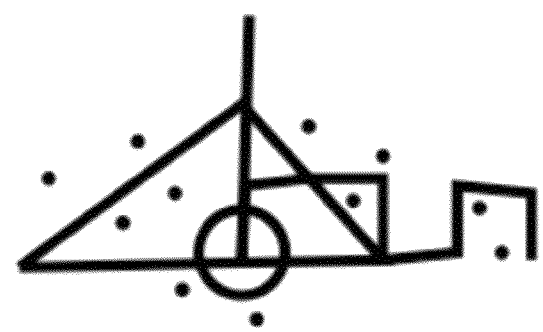

FIG. 12 shows a transformation between two patterns.

Figure 13:
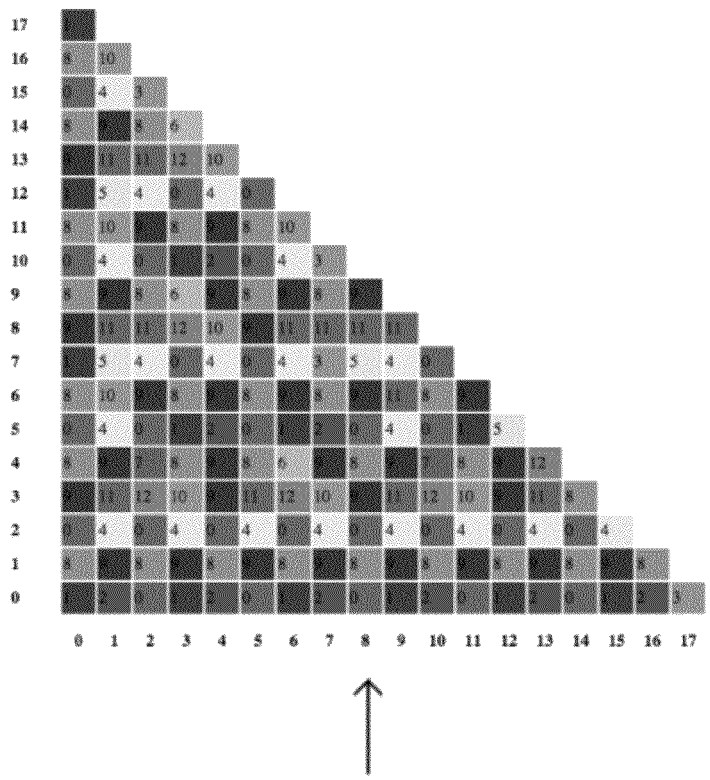
Figure 13:
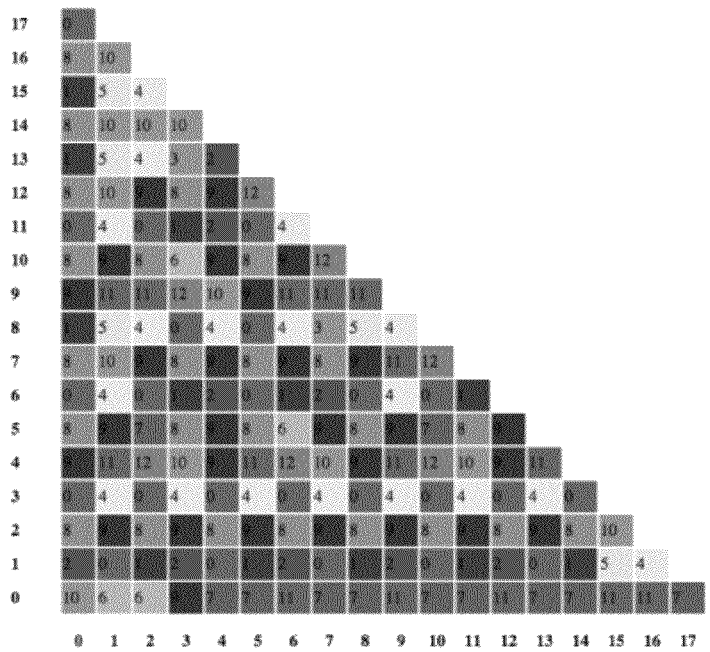

FIG. 13 shows a transformation between two color patterns.

Figure 14:
Figure 14:
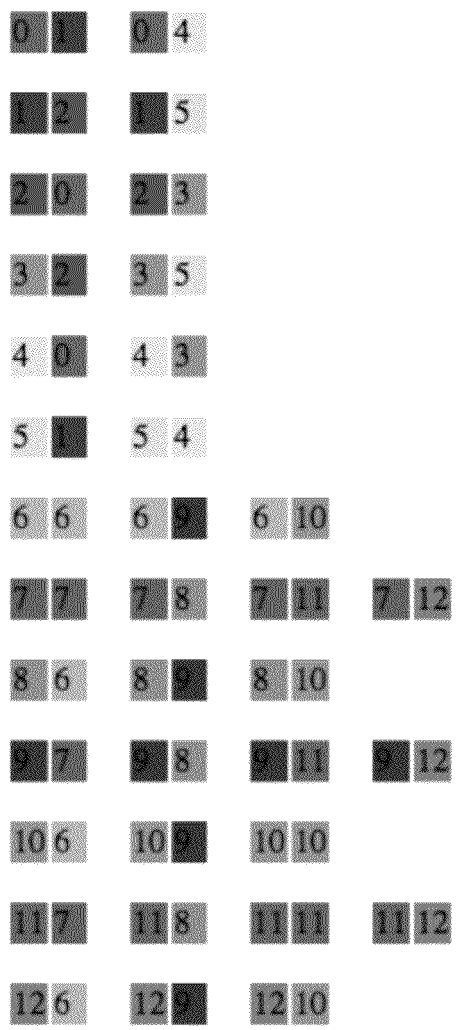

FIG. 14 shows the color to number correspondence and horizontal rules with respect to color patterns in FIG. 13.

FIG. 15 shows the vertical rules with respect to color patterns in FIG. 13.

Figure 16:
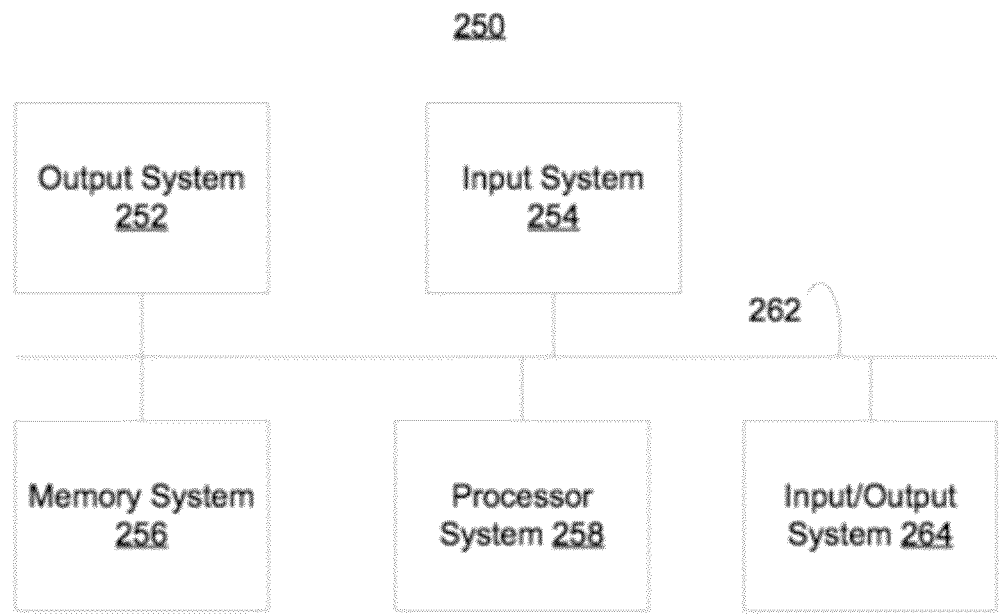

FIG. 16 shows a secure area which includes a processor, memory and input/output system.

Figure 17:
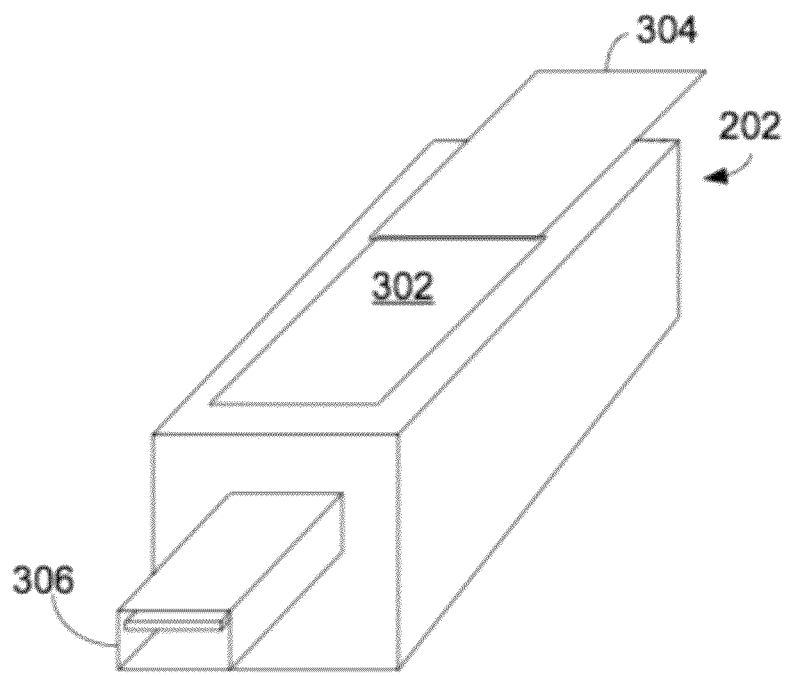

FIG. 17 shows a USB drive with biometric sensor.

Figure 18:
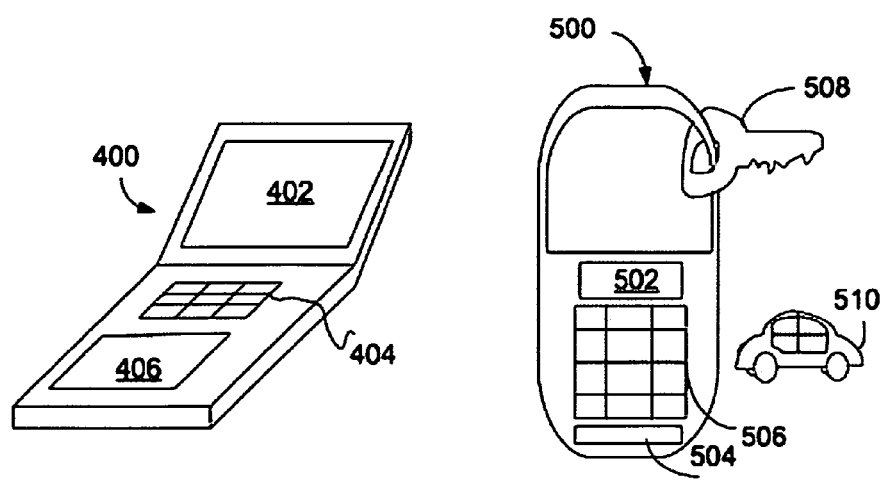

FIG. 18 shows a mobile phone.

Figure 19:
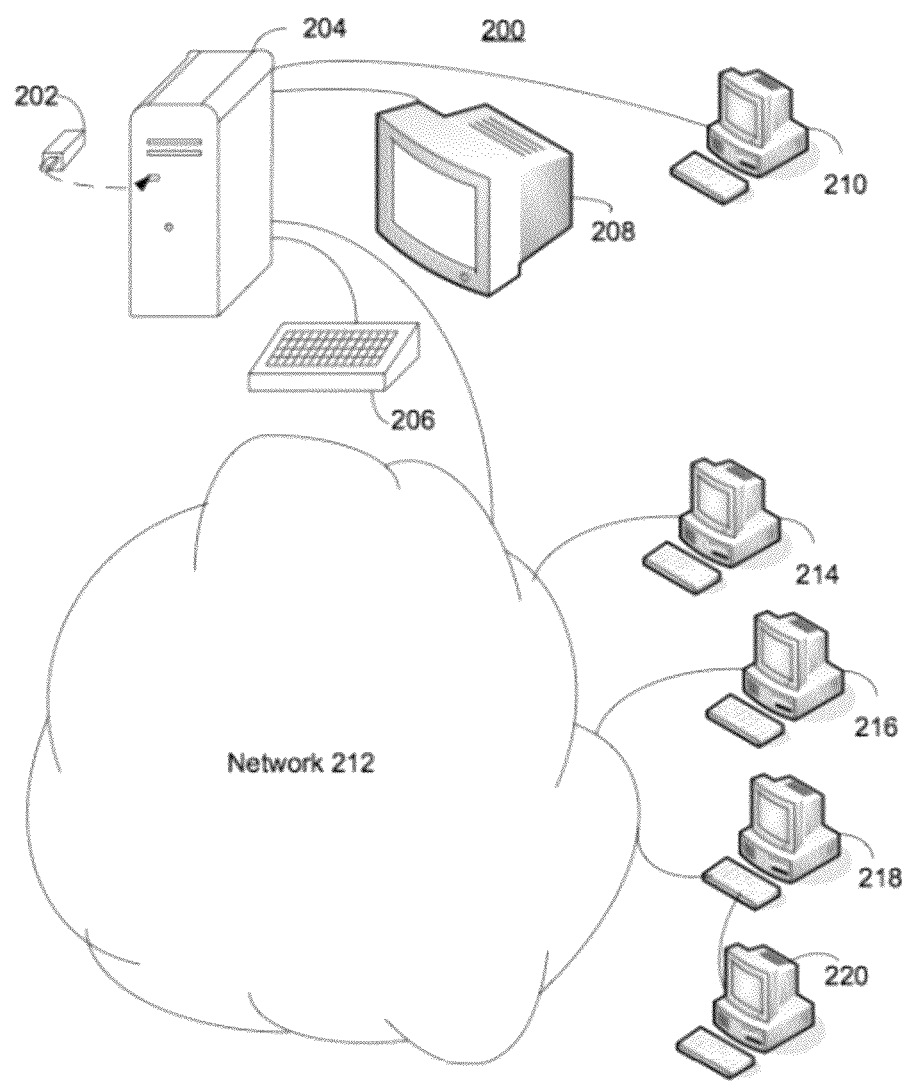

FIG. 19 shows a computer network which in some embodiments may be the Internet or a part of a network that supports an infrastructure such as the electrical grid, a financial exchange, a power plant.

LIMITATIONS OF PRIOR ART AND THE VALUE OF A GOOD SOLUTION

In the prior art, companies and inventors have tried to hide and protect cryptography keys, codes and other user credentials. The extensive development of the Internet, wireless connectivity and the development of malware has made mobile phones, personal computers, server computers, and tablet computers such as the IPad vulnerable to cyberattacks based on cybersecurity methods in the prior art. On page 233, the book (Author: Joseph Menn, ISBN-10: 1586487485), *Fatal System Error* states that the amount of losses due to cybersecurity breaches is about $1 trillion per year!

Practical applications dependent on computer security use cryptography keys, cryptography codes—such as one-time passcodes—and other user credentials to protect the secrecy, authenticity and integrity of these applications. In some applications, cryptography keys and/or cryptography codes and/or user credentials help secure confidential data such as financial information, financial transactions, and infrastructure (e.g. the electrical grid, irrigation systems, power plants, defense systems and other critical infrastructure). Confidentiality, authenticity, integrity, authorization and accounting are needed in a cybersecurity system and rely on cryptography keys, cryptography codes—such as one-time passcodes—and other user credentials to protect them.

In some embodiments, cryptography keys, cryptography codes—such as one-time passcodes—and other user credentials are used to secure transaction information and securely transfer money from one account to another. In some embodiments, cryptography keys, cryptography codes—such as one-time passcodes—and other user credentials are used to help secure the execution of a stock or derivative transaction.

The prior art has attempted to generate (e.g. derive) an invariant from a biometric template or a print, that can be used as a security key or security code. In the prior art, U.S. Pat. No. 5,991,408 describes a method(s) of deriving a clique (graph) from fingerprint minutiae and then using this graph to help create a key. This method(s) was unsuccessful due to the variability of the fingerprint minutiae extracted from biometric prints coming from the same finger.

Other attempts to generate an invariant from a biometric have been unsuccessful. In some of these unsuccessful attempts, they have attempted to build or implement a function or transformation from the biometric template to a structure that is representative of the cryptography key or code. In some cases, this structure is used to create a cryptography key or code. In a mathematical representation, these unsuccessful approaches sometimes generate a key K from a biometric B;

in other words, B is converted to K(B), which means the key K is derived from biometric print B or biometric template B. This approach has been unsuccessful. When two distinct biometric templates or prints $B_1$ and $B_2$ are acquired from the same person, usually $B_1 \neq B_2$; the prior art has been unsuccessful at finding a reliable conversion method that satisfies $K(B_1) = K(B_2)$. Overall, the complexity of biometric variability has made it difficult for this approach in the prior art to successfully and consistently generate an invariant.

DETAILED DESCRIPTION

Although various embodiments of the invention may have been motivated by various deficiencies with the prior art, which may be discussed or alluded to in one or more places in the specification, the embodiments of the invention do not necessarily address any of these deficiencies. In other words, different embodiments of the invention may address different deficiencies that may be discussed in the specification. Some embodiments may only partially address some deficiencies or just one deficiency that may be discussed in the specification, and some embodiments may not address any of these deficiencies.

Biometric authentication, using fingerprints, multiple fingers, handprints, face prints, retinal scans and voice recognition, may be used as a means of granting access to an individual, for example, to use a device or gain entry to a building, car, computer, airport, website, a bank account, execute a financial transaction, access a military installation, read or obtain confidential information, execute a legal agreement, authenticate a decision, or another entity. Biometric authentication can be used as an alternative to the use of key(s), code(s), user credential(s) or combination or as method of identifying the user. Access may be in any of a number of forms. For example, access may be in a physical form, such as permitting the user to open a auto door, or it may be electronic in nature, such as granting access to a PC, starting an automobile engine, accessing an online database, executing a financial transaction, executing a legal agreement, or executing an action or using a resource on infrastructure such as the electrical grid, a power plant or SIPRnet.

In an embodiment, cryptography keys, cryptography codes—such as one-time passcodes—and other user credentials are used to help secure transactions that are executed on a financial exchange. In an embodiment, the financial exchange is NASDAQ. In an embodiment, the financial exchange is the New York stock exchange. In an embodiment, the financial exchange is the London International Financial Futures and Options Exchange. In an embodiment, the financial exchange is the Chicago Board of Trade. In an embodiment, the financial exchange is the Tokyo Stock Exchange. In an embodiment, the financial exchange is the Hong Kong stock exchange. In an embodiment, the financial exchange is the OTC (over the counter) derivatives market. In an embodiment, a network of computers as shown in FIG. 19 may help execute financial transactions for a financial exchange.

In an embodiment, in order to grant access to an individual or provide user preferences, the device or system should have the fingers or hand print (or other biometric template) stored in a way that makes possible a comparison between a stored template and the individual's finger (e.g., any representation of the fingerprint). In an embodiment, this comparison is represented and computed by one or more transformations. FIG. 9 shows an example of a transformation between two hand prints.

The biometric prints may be obtained in different ways depending on the type of biometric, the type of sensor and the device (e.g. mobile phone, PC) that contains the sensor or that is connected to the sensor. In an embodiment, in order for the biometric print(s) or template(s) to be stored, the individual either enrolls through the use of hardware that acts as a biometric sensor. In an embodiment, a touch sensitive screen on a mobile phone or an IPad may serve as a biometric sensor. This kind of screen could obtain part of a hand print, multiple fingers or a fingerprint. In an embodiment, the microphone on an IPhone, Android or other phone may serve as a biometric sensor for voice prints. In an embodiment, the camera on a phone may be used as a biometric sensor for a face print or ear print. In an embodiment a specialized sensor may be integrated into the device. In an embodiment, this may be a fingerprint sensor. In an embodiment, this specialized sensor may be a camera or lens that is an iris sensor.

In some embodiments, using a biometric sensor, an individual may place his/her body part near the sensor, or near the hardware that serves as a biometric sensor. After the image is obtained, in some embodiments, a features extraction algorithm is used to locate features on the image or biometric print. After the extraction is finished, the features from one biometric print are matched with features from one or more biometric prints that were obtained during enrollment—also called setup. If the features match well, then the user is allowed access. In an embodiment, the quality of the match is determined by a match score. If the features do not match well, then the user is denied access. This process of allowing or denying access is called authentication. In an embodiment, one or more transformations are generated from the authentication.

During authentication, the frequency with which an enrolled and valid user's biometric print is rejected as a match is known as the False Reject Rate (FRR); the frequency with which an imposter's biometric print is erroneously accepted as a match is known as the False Acceptance Rate (FAR). In an embodiment, during authentication, a useful goal of a feature matching method is to reduce the FRR and also to reduce the FAR.

In this specification, there are method, system and machine embodiments described for protecting biometric data, algorithms, cryptography keys, codes, dynamic identity and user credentials on security devices and security systems. In an embodiment, the device that needs security may be portable or mobile. In some embodiments, the device may be a smart card, a flash drive, a tablet computer (IPad), a mobile phone (IPhone, an Android Phone or blackberry) or a personal computer. In some of these embodiments that are placed on off-the-shelf commercial products, there may be additional hardware or software added to help with security.

In an embodiment, biometric sensors and PIN/Password input devices are on the outside of the mobile security device as shown in FIG. 18. In an embodiment, the biometric sensor may be part of the mobile phone such as the touch screen or the camera as shown in 406 and 402. In other embodiments, the biometric sensor or PIN input device may come from hardware that is separate from the phone as shown. In an embodiment, the biometric sensor in 302 of FIG. 17 or biometric sensor 406 in FIG. 18 are only accessible by secure processing area 250. In FIG. 18, password/PIN entry may only accessible by the secure area 250 in FIG. 16 for a duration of time: this helps resist keyboard logging and screen logging cyberattacks.

In an embodiment, the device is a mobile phone as shown in FIG. 18. Letter, number and other character entry at 404 may connect directly to secure chip with components shown in figure A biometric sensor(s) at 402 or 406 may connect via Input/Output system 264 directly to secure area 250 in FIG.

16. The secure area 250 is functionally distinct from the circuitry of a processor chip running the mobile phone operating system such as Android OS or iOS which runs on the IPhone. In FIG. 16, processor system 258, memory system 256, and Input/Output system 264 make up the secure area 250.

In an embodiment, the secure area 250 is on the same chip that executes an operating system but it is functionally separate. In terms of functionally separate, in an embodiment, there is not any connection or access from the biometric sensor or data input device or secure area to the part of the chip running an operating system. In an embodiment, the secure area 250 is not connected to the network and not connected to the Internet. In an embodiment, the biometric sensor in 302 of FIG. 17 or biometric sensor 406 in FIG. 18 is connected to the secure area 250 in FIG. 16 and there is no direct connection to wireless communication channels.

The method of protecting information is designed to be independent of the type of biometrics and the type of sensor. In an embodiment, biometric sensor in 302 of FIG. 17 or biometric sensor 406 in FIG. 18 may obtain fingerprint templates from fingerprints. In an embodiment, biometric sensor in 302 of FIG. 17 or biometric sensor 402 in FIG. 18 may acquire face prints. In an embodiment, biometric sensor in 302 of FIG. 17 or biometric sensor 406 in FIG. 18 may obtain prints from multiple fingers.

In an embodiment, biometric sensor in device 202 of FIG. 17 or microphone in FIG. 18 may acquire voice prints. In an embodiment, finger veins, hand geometry prints, prints from the human ear and other kinds of prints coming from a person may be acquired.

In an embodiment, secure area 250 in FIG. 16 may use a smart card chip as a part of the hardware In an embodiment, secure area 250 may use a floating point gate array (FPGA) chip, which is programmed to securely execute biometric and cryptographic operations. In an embodiment, the device containing secure area 250 may be used to encrypt/decrypt and securely store confidential or classified information and data.

In an embodiment, the authentication or the construction of secure cryptography keys and codes may use one or more of each: "what you know" (Password, PIN, Passphrase, picture or personal information), "what you are" (biometrics), and "what you have" (the mobile security device). In an embodiment, "what you know" may be a birthday, a street address, a place, a home, a name of a person or special place, or other knowledge that is uniquely known by a person.

In an embodiment, dynamic identity codes are generated on a device such as the devices shown in FIG. 17 or FIG. 18. Furthermore, the user does not have to remember her passcode as the dynamic identity creates codes that may only be used once. In an embodiment, after a passcode is used once, it may no longer enable access to a system or account. In addition, the dynamic identity can be a standalone portable device that makes it difficult for an attacker to gain access to (see FIG. 17). The portable embodiment enables users to compute one-time passcodes in remote places such as inside an airplane, out on an oil tanker, in a satellite, and other places far removed from AC power sources.

Although the authentication may sometimes be described using one type of biometric print or template as an example, other items may be used for one of the factors in authentication, such as face prints, iris scans, toe prints, fingerprints, handprints, more than one finger at a time that uses part or all of each finger, voice prints, and ear prints. In an embodiment, a factor used for authentication may be any item that is unique. In an embodiment a factor used for authentication is one that is difficult to fabricate, guess, find by trial and error, and/or compute. In an embodiment, an authentication factor may be a visual pattern as shown in FIG. 12 or a color pattern as shown in FIG. 13 or an auditory pattern. In some embodiments, these patterns are not derived from biometric information. In an embodiment, one of the factors used for authentication is uniquely associated with the user. In an embodiment, one of the factors used for authentication has an unpredictable element to it. In an embodiment, one of the unpredictable elements is randomness or noise or biometric variation.

In an embodiment, the biometric print acquisition may use multiple fingers and the acquisition is connected to a secure area on a chip. In an embodiment, the biometric print acquisition may use face prints and the acquisition is connected to a secure area on a chip. In an embodiment, the biometric print acquisition may use voice prints and the acquisition is connected to a secure area on a chip. In an embodiment, the biometric acquisition may occur on a touch sensitive screen of a mobile phone. In an embodiment, dynamic identity is at least partly derived from the biometric prints.

Each of the above embodiments may be used separately from one another in combination with any of the other embodiments. All of these embodiments may be used together.

Vocabulary

The word administrator broadly refers to a computer or possibly another electronic device, or person that grants a particular user access to its resources or enables a particular event (e.g., a financial transaction, or landing a plane at an airport, and so on).

The identity code, denoted as R, is a sequence of symbols. An example of a identity code with 16 symbols is Pwt4uH9xBL49 Cp5M and a identity code with punctuation and other symbols may also be used. An example with 32 symbols is $8*@LM&sv7D-n3j5!{bi6+x=:R&4Q9AZ% There is at least one unique identity code for each dynamic identity. The identity code is created during enrollment and securely given to the administrator.

The passcode, denoted as P, is a sequence of symbols. An example of an alphanumeric passcode with 8 symbols is Y3dP9xwB and an example with 16 symbols including punctuation and other symbols is (ia@kLe892J%pms+

Each time a user successfully authenticates on a device (e.g. FIG. 17 or FIG. 18), the next dynamic identity is computed, and a new one-time passcode is created. The passcode is transmitted to the administrator, who then checks that the passcode is derived from one of the identity codes in the database.

The dynamic identity, denoted as G, is stored in the user's secure memory and enables the device to quickly create a one-time passcode. G is also stored securely by the administrator so that the administrator can verify a passcode that the user submits.

V is used to represent "something that is known" (in other words, "what is known") that other people or devices do not know. In some embodiments, V is something that is known" only within the secure area but not known outside the secure area. (See FIG. 16). Passphrases such as (fred, blue, apple, dog), a password 4Jx4NmX_e or a PIN such as 6789 or other personal information such as a birthday, a name, a favorite place, a sequence of one or more pictures or images may help contribute to some or all of the value of V. In an embodiment, one or more patterns as shown in FIGS. 12 and 13 may help derive V.

The symbol B is used to represent "what you are". It could be biometric information extracted from one or more biometric prints or biometric templates. B may be in the form of a single number, a sequence of numbers or a sequence of bits or another representation of some biometric information.

The symbol h is used to represent a function. In some embodiments, h may be a Boolean function. In an embodiment, h may be a one-way function or one-way method. (One-way methods are described below.)

The symbol T is used to represent a transformation between two biometric templates coming from the same person and similar parts of the body.

In an embodiment, the invariant is something that does not change. In an embodiment, the invariant is at least partially generated (e.g., derived) from the biometric templates and a transformation between the biometric templates (in this specification, the word "derive" can be used in place of "generate" in any place to obtain a more specific embodiment). In an embodiment, a transformation or transformations help perform an authentication of the user.

In an embodiment, computer instructions execute a transformation between two or more biometric templates, whose execution helps generate (e.g. in this specification, the word "derive" can be used in place of generate) an invariant: in an embodiment, one or more of these transformations generating the invariant help authenticate the person. In an embodiment, the invariant is not generated until after a valid authentication of the person.

In an embodiment, a transformation between two or more biometric prints coming from the same person helps generate an invariant. In an embodiment, a transformation—between two or more biometric prints coming from the same person—is derived from the authentication of the biometric prints. In an embodiment, computer instructions execute the authentication of a biometric print and the transformation is derived during this execution of computer instructions. In an embodiment, when a biometric print acquired during authentication is determined invalid the transformation derived from the authentication generates an invalid invariant.

In an embodiment, the biometric prints may be different at more than 100 distinct points. In an embodiment, the biometric prints may be different at more than 1,000 distinct points. In an embodiment, the biometric prints may be different at more than 10,000 distinct points.

Figure 5:
FIG. 5 shows two portions of the same fingerprint, whereby the transformation from the top portion to the bottom portion is a (−83, −764) translation and a rotation of 30 (thirty) degrees. Sometimes this transformation may be called an affine transformation or more specifically a local affine transformation since the affine transformation maps only a portion of the fingerprint to another location (translation) and orientation (rotation).
Figure 5:
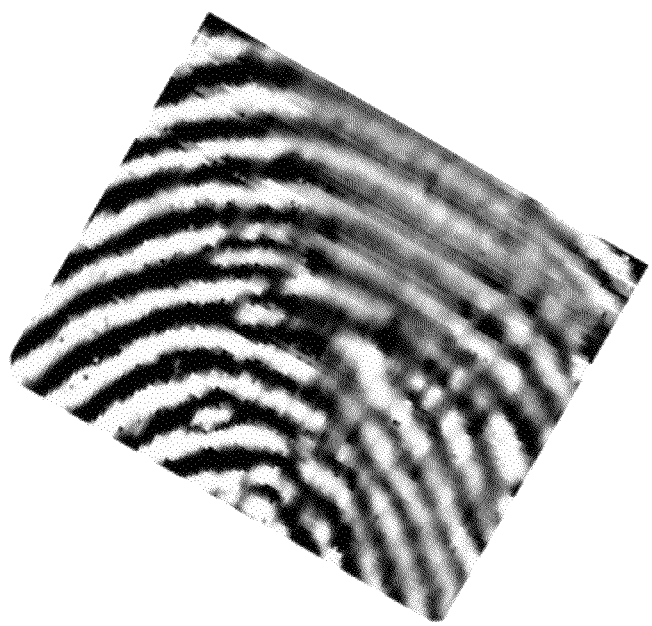

In an embodiment, the transformation T may be a transformation between two face prints from the same person and the transformation is used to help generate an invariant. FIG. 10 shows an example of a transformation between face templates. In an embodiment, a transformation between two iris prints from the same eye help generate an invariant. FIG. 8 shows an example of a transformation between iris templates. In an embodiment, a transformation between two or more fingerprints acquired from the same finger help generate an invariant. FIG. 5 shows an example of a transformation between two fingerprints.

In an embodiment, a transformation T is executed between two or more patterns that are not derived from biometric templates or biometric images. FIG. 12 shows a transformation between two patterns. In FIG. 12, the invariant can be derived from T can utilize the circle, triangle, vertical line, rectangle, and stair step shape which appear in both geometric patterns. In FIG. 12, the bottom pattern has these geometric shapes slightly deformed. Some possible transformations between these two patterns are non-linear. In an embodiment, geometric patterns may be presented in 3 dimensions—for example in a hologram. In an embodiment, geometric patterns may be used that are in 4 or 5 dimensions. In an embodiment, geometric patterns may used that are in n dimensions where n is a large positive integer.

FIG. 13 shows a transformation between two color patterns. In an embodiment, color patterns may be frequency or number patterns, which are used to help derive an invariant. In FIG. 13, the color red corresponds to the number 0. Dark blue corresponds to the number 1. The number 2 is dark green. 3 is grey. 4 is yellow. 5 is pink. 6 is light blue. 7 is purple. 8 is orange. 9 is brown. 10 is light green. 11 is aqua and 12 is lime green. One transformation T that generates an invariant between the two color patterns in FIG. 13 depends on horizontal and vertical rules.

The horizontal rules are shown in FIG. 14 and the vertical rules are shown in FIG. 15. The horizontal rules in number format are {(0, 1), (0, 4), (1, 2), (1, 5), (2, 0), (2, 3), (3, 2), (3, 5), (4, 0), (4, 3), (5, 1), (5, 4), (6, 6), (6, 9), (6, 10), (7, 7), (7, 8), (7, 11), (7, 12), (8, 6), (8, 9), (8, 10), (9, 7), (9, 8), (9, 11), (9, 12), (10, 6), (10, 9), (10, 10), (11, 7), (11, 8), (11, 11), (11, 12), (12, 6), (12, 9), (12, 10)}. As mentioned above, 0 is red. 1 is dark blue. 2 is dark green. 3 is grey. 4 is yellow. 5 is pink. 6 is light blue. 7 is purple. 8 is orange. 9 is brown. 10 is light green. 11 is aqua and 12 is lime green. The vertical rules are {(0, 2), (0, 4), (0, 5), (0, 8), (0, 9), (0, 12), (1, 2), (1, 4), (1, 5), (1, 8), (1, 9), (1, 12), (2, 2), (2, 4), (2, 5), (2, 8), (2, 9) (2, 12), (3, 10), (3, 11), (4, 10), (4, 11), (5, 10), (5, 11), (6, 0), (6, 1) (6, 3), (7, 0), (7, 1), (7, 3), (8, 0), (8, 1), (8, 3), (9, 2), (9, 4), (9, 5), (9, 8), (9, 9), (9, 12)}. There are multiple transformations that can derive these horizontal rules and vertical rules from the two patterns shown in FIG. 13. The horizontal and vertical rules or subsets can be used to generate a number invariant, a sequence of numbers invariant, a sequence of bits invariant, a sequence of characters invariant, or another representation of an invariant. In an embodiment, a transformation may permute the colors and derive the horizontal rules and vertical rules in a permuted form. An example of a permutation $\pi$ of the colors is $\pi(0)=5, \pi(5)=12, \pi(12)=9, \pi(9)=0, \pi(2)=6, \pi(6)=4, \pi(4)=8, \pi(8)=10, \pi(10)=2, \pi(1)=3, \pi(3)=1, \pi(7)=11, \pi(11)=7$. In FIG. 13, there are 13!=6,227,020,800 permutations of these 13 colors. There are many different transformations that can generate an invariant from these color patterns.

In an embodiment, the patterns can be created by computer instructions that may be described as deterministic. In an embodiment, the computer instructions execute a transformation between the patterns that generates an invariant. An invariant is a relationship between the patterns that does not change despite the fact that similar patterns may be different at a number of different points.

In an embodiment, randomness or noise may be used along with the computer instructions to generate a pattern. In an embodiment, two or more patterns having a relationship such that an invariant can be derived (e.g. invariant relationship) may be different at more than 1,000 distinct points. In an embodiment, two or more patterns having an invariant relationship may be different at more than 10,000 distinct points. In an embodiment, two or more patterns having an invariant relationship may contain an image recognizable by a person. In an embodiment, the recognizable image contributes to part of the invariant that is generated.

In an embodiment, a pattern may be stored on a flash drive. In an embodiment, the pattern may be stored on a driver's license card or passport. In an embodiment, the pattern may be encoded with different colors as shown in FIG. 13.

In an embodiment, the invariant is generated from two or more patterns and transformation(s) between the patterns. An example of a transformation between patterns is shown in FIG. 12. In an embodiment, one or more of the patterns may have noise added to them. In an embodiment, the computation of the computer instructions executing the transformation may be influenced by at least part of one or more of the patterns. In an embodiment, the transformation between patterns may be generated during authentication of a user who knows or possesses one of the patterns. In one embodiment, the user possesses a pattern used for authentication on a flash drive. In one embodiments, the user has a device that contains the pattern. In one embodiment, the user knows a pattern (e.g. something that is known) and the device has a user interface for displaying different patterns to user and the user chooses the valid pattern. In an embodiment, the user selects a valid pattern from the user interface. In an embodiment, the user selects two or more valid patterns from the user interface as part of authentication. In an embodiment, one or more transformations are generated from this authentication between one or more valid patterns.

In an embodiment, the transformation may be a diffeomorphism. Some examples of a diffeomorphism are shown in FIG. 11. Some diffeomorphisms bend the shape of the transformed object. In an embodiment, a diffeomorphism may bend (e.g. deform) the shape of a biometric print. In other embodiments, a diffeomorphism may bend (e.g. deform) the shape of a pattern. In other embodiments, a diffeomorphism may transform the shape of a biometric template.

In an embodiment, the transformation T is a continuous function. In an embodiment, the transformation T is a discrete function. In an embodiment, T is not a function. In an embodiment, T is a relation between two biometric prints or templates. In an embodiment, T is a relation between two biometric prints or biometric templates but not a function. In an embodiment, the transformation T may be an affine transformation between two templates.

In an embodiment, the transformation T is represented by one or more functions or one or more relations. In an embodiment transformation T between biometric prints or templates uses one or more functions and one or more relations. In an embodiment transformation T between two patterns uses one or more functions and one or more relations.

In an embodiment, the transformation T is represented by at least two or more affine functions. In an embodiment, the transformation T is represented by at least two or more discrete functions. In an embodiment, computer instructions execute at least two or more discrete functions which generate a relationship between two or more patterns: in an embodiment, the invariant is generated at least partly by a relationship among the patterns.

In an embodiment, the transformation T is executed by digital computer program instructions. In an embodiment, computer program instructions that compute the transformation are executed on a computer chip with an ARM architecture, www.arm.com. In an embodiment, computer instructions execute a transformation on an Intel computer chip. In an embodiment, this computer instructions execute a transformation on a mobile phone as shown in FIG. 18.

In an embodiment, the matching of biometric templates occurs with affine transformation maps.

A hash function, denoted $\Phi$, is a function that accepts as its input argument an arbitrarily long string of bits (or bytes) and produces a fixed-size output. In other words, a hash function maps a variable length message m to a fixed-sized output, $\Phi(m)$. SHA-512 has an output size of 512 bits.

A hash function may be one of the SHA-3 candidates, which are currently being evaluated. A candidate hash function is BLAKE <http://en.wikipedia.org/wiki/BLAKE_(hash_function)>. Another candidate hash function is GrØstl <http://en.wikipedia.org/wiki/Grøstl>. Another candidate hash function is JH <http://en.wikipedia.org/wiki/JH_(hash_function)>. Another candidate hash function is Keccak <http://en.wikipedia.org/wiki/Keccak>. Another candidate hash function is Skein <http://en.wikipedia.org/wiki/Skein_(hash_function)>. Any one of these hash functions may be used in embodiments described in this specification. Alternatively, other hash functions may be used in embodiments.

An ideal hash function is a function $\Phi$ whose output is uniformly distributed in the following way: Suppose the output size of $\Phi$ is n bits. If the message m is chosen randomly, then for each of the $2^n$ possible outputs z, the probability that $\Phi(m)=z$ is $2^{-n}$.

One-way hash functions are desirable. A one-way function $\Phi$ has the property that given an output value z, it is computationally extremely difficult to find a message m, such that $\Phi(m_z)=z$. In other words, a one-way function $\Phi$ is a function, that can be easily computed, but that its inverse $\Phi^{-1}$ is extremely difficult to compute. Suppose G denotes a string or sequence of bits. $\Phi^k$ denotes that the one-way function $\Phi$ is applied k times to input G. For example, when k=3, then $\Phi^k(G)$ means $\Phi(\Phi(\Phi(G)))$.

Enrollment or setup refers to when one or more users enter "what they are" and "what they know" into "what they have" the device so that they only have access to the device. During enrollment, in the secure module, after enough of "what you are"—for example, satisfactory biometric templates—have been obtained, two or more biometric templates may be encrypted on a chip. In an embodiment, "what you know", may also be acquired. In an embodiment, a password, PIN or passphrase or a visual or auditory pattern may be used to help create cryptography keys, or codes or user credentials, or encrypt other keys that encrypt the proprietary executable code on the mobile security device.

Elliptic Curve Cryptography

This section describes Elliptic Curve Cryptography (ECC) that in some embodiments may be used as a public key cryptography to securely encrypt and transfer keys, codes, data or transaction information. It may also be used in an embodiment to encrypt one-time passcodes. The Diffie-Hellman assumption holds for elliptic curves of the form $y^2=x^3+ax+b$. Find a point Q such that Q=SP for some integer S such that 0<S<n where n is the order of P.

ECC Encryption Steps:
Input: Public key (P, Q) and plaintext message M
A.) Select a random integer w such that 0<w<n
B.) Compute R=wP and Z=wQ
C.) If Z=O, go back to step A. and repeat the process
D.) Compute k=KDF(X(Z), R), where X(Z) is the x-coordinate of Z and KDF is a key derivation function created from a hash function.
E.) Compute C=Encrypt(k, M) where Encrypt denotes a symmetric-key encryption algorithm.
F.) Output (R, C) {C denotes the ciphertext.}

ECCA Decryption Steps:
Input: Public key (P, Q), output (R, C) and secret key S
A.) Compute Z=SR
B.) Compute k=KDF(X(Z), R)
C.) Compute M=Decrypt(k, C) where Decrypt denotes a symmetric-key encryption algorithm.

In an embodiment, the symmetric-key encryption algorithm may be AES with 256 bit keys. The KDF function may be SHA-512 or another one of the one-way hash functions.

Keys and Codes Resistant to Cyberattacks

Machines and methods are presented for protecting keys and codes using one, two or more factor authentication. If the security device—for example, mobile phone shown in FIG. 18—is captured in the field and subsequently reverse engineered, the purpose here is to hinder an adversary or thief from reading confidential or classified data, building a duplicate system, capturing or duplicating the cryptography keys, capturing or duplicating the codes, capturing or duplicating one-time passcodes and capturing or duplicating any other items that should be kept secret.

In an embodiment, the following steps are executed to enroll a user to gain access to a security system or utilize the system's resources or carry out a transaction. An example of a system's resources or infrastructure is shown in FIG. 19.

Step 1. User presents authentication factor(s) one or more times to the device.

Step 2. On the device computer program instructions are executed that determine whether authentication factors are acceptable.

Step 3. If authentication factors are accepted, then computer program instructions store information on the device, which is derived from the authentication factors. The stored information on the device is used during authentication to generate an invariant.

Examples of devices mentioned in steps 1, 2 and 3 are shown in FIGS. 17 and 18. In an embodiment, the authentication factor is a biometric. In an embodiment, the device is a mobile phone as shown in FIG. 18. In an embodiment, one or more transformations are computed between acquired authentication factors and these transformations help generate an invariant.

In an embodiment, the following steps are executed to generate an invariant during authentication.

Step 1. A device acquires one or more biometric prints or patterns from the user.

Step 2. Computer instructions on the device attempt to authenticate acquired biometric print(s) or acquired pattern(s) against information stored on the device during enrollment.

Step 3. Computer instructions executing the authentication in step 2 construct one or more transformations that help generate an invariant.

Step 4. Invariant generated from a valid authentication in step 3 is used to generate cryptography key, code or user credential(s).

In an embodiment, biometric information, denoted B is created during enrollment. In an embodiment, "something that is known" V is generated during enrollment to hinder attempts to computer or guess an invariant. In an embodiment, V may generated at least partially from passphrase/password/PIN information, denoted as J, obtained during enrollment. In an embodiment, V may generated at least partially from one or more patterns as shown in FIGS. 12 and 13.

Information J from keypad 404 or keypad 506 in FIG. 18 can be obtained during enrollment, which helps generate V. In an embodiment, $V=\Phi(J)$. In an embodiment, V is obtained from hidden information X stored in a secret location on the device. In an embodiment, $V=\Phi(X)$. In an embodiment, $\Phi(X*J)$, where * is concatenation.

In an embodiment, hidden information X may have physical barriers surrounding it to hinder reverse engineering from capturing or reading X. In FIG. 17, device 202 has a physical barrier around its secure area. In an embodiment, X is surrounded by a physical barrier that is opaque to electromagnetic radiation such as UV light. In an embodiment, X is created during enrollment to hinder attacks or security breaches produced during manufacturing of the security device. In an embodiment, the algorithms that create X use biometric noise from the sensor to increase the entropy in X. In an embodiment, X may have an entropy of greater than 10 million bits. In an embodiment, X may have an entropy greater than (10 to the $50^{th}$ power) bits i.e. greater than $10^{50}$ bits.

In an embodiment, to hinder attacks or security breaches, "something that is known" V is generated only after a valid authentication and immediately erased from memory after being used. In an embodiment, the algorithms that generate V use biometric noise from the sensor to increase the entropy in V. In an embodiment, the computer instructions that generate V execute one or more one-way functions. In an embodiment, V may have an entropy of 10,000 bits. In an embodiment, V may have an entropy of greater than 10 million bits. In an embodiment, V may have an entropy greater than (10 to the $50^{th}$ power) bits i.e. greater than $10^{50}$ bits.

As mentioned, in an embodiment, T represents a transformation between two biometric templates or prints (e.g. FIGS. 7, 8, 9, and 10). In an embodiment, T is a transformation between two templates acquired during the enrollment on the device. In an embodiment, the cryptography keys and codes are not stored on the device. Further, in an embodiment, either B or V or both are not stored on the device. In an embodiment, where B and V are not stored on the device, the adversary may attempt to guess or reconstruct B and V based on information stored on the chip(s) inside the captured device. In an embodiment, this device may be a mobile phone as shown in FIG. 18. In an embodiment, the device may be a flash drive as shown in FIG. 17. In an embodiment, the device may be worn on the wrist similar to a wrist watch.

In embodiments, a desirable goal is to make B and V mathematically intractable to guess or reconstruct. To hinder these guessing or reconstruction attacks, an invariant w is generated so that the security system uses the B and V information obtained immediately after authentication to derive the correct keys or codes. In this specification, the symbol K will denote key(s) or code(s) or user credential(s) that should remain secret and is (are) not stored on the device. In an embodiment after authentication, K is derived as $K=h(V, T)$ where h is some function. In an embodiment, h may be a one-way function or one-way method. In an embodiment, h may use a one-way method from public/private key cryptography such as elliptic curve cryptography or RSA. In an embodiment, $\Phi$ may be a one-way function or one-way method. In an embodiment, $\Phi$ may use a one-way method from public/private key cryptography such as elliptic curve cryptography or RSA.

In an embodiment, K may be computed as $K=\Phi(V*T)$ where * is concatenation. In an embodiment, K may be computed as $K=\Phi(T*X)$ where * is concatenation. In an embodiment, K may be computed as $K=h(T, X)$.

In an embodiment w may be computed as $w=\Phi(K)$. In some other embodiments where only a biometric factor is used, w can be computed as $w=\Phi(\Phi(T))$ or $w=\Phi(h(T))$. In still other embodiments where only "what you know" is used as a factor, w can be computed as $w=(\Phi(\Phi(V))$ or computed as $w=\Phi(h(V))$.

In an embodiment where two or more factors are used, then a numeric conversion function a may be applied to the passphrase, password or PIN. In other words, let J denote the passphrase, password or PIN, then $\alpha(J)$ is a positive integer. In an embodiment, the function $\alpha$ is chosen so that $e=\alpha(J)$ is large enough such that it takes about one second to compute on the $\Phi^e$ on the chip in the device where biometric and cryptographic computations take place. This may help with mathematically intractability when reverse engineering attacks are attempted. In these embodiments, $U=\Phi^e(w)$ is stored on the chip in the mobile device where biometric and cryptographic computations take place.

Let $S_1$ be the transformation map between the biometric template just authenticated and the first template obtained during enrollment; let $S_2$ be the transformation map between the biometric template just authenticated and the second template obtained during enrollment. In an embodiment, these templates are encrypted. On the device, in an embodiment, the transformation difference, $S_2-S_1$, is computed. In other embodiments, the transformation difference may be $S_2 \circ (S_1)^{-1}$. Then $Z=\Phi_{e+1}(h(V, S_2-S_1))$ is computed.

Observe that if $T=S_2-S_1$, then for embodiments satisfying:
A.) $K=h(V, T)$
B.) $w=\Phi(K)$
C.) $U=\Phi^e(w)$ then the Z computed after authentication equals U stored on the chip right after enrollment. This provides a check that $K=h(V, S_2-S_1)$ in order for the security system to know that it has generated the correct key or code. In this embodiment, invariant K depends on "something that is known" V and transformation difference $S_2-S_1$ in the sense that V and $S_2-S_1$ are input values to function h or one-way method h.

In an embodiment, these computations are executed by computer instructions inside a single chip. In an embodiment, these computations occur in a secure area of the chip that is functionally distinct from the part of the chip that executes an operating system. In an embodiment, this chip may be in a mobile phone as shown in FIG. 18.

Sometimes an acquired biometric print is similar to a snowflake since rarely if ever are two biometric prints identical. Consequently, the transformations $S_1$ and $S_2$ resulting from authentication may be different from transformation T which was computed during enrollment of the user on the device. Because of this snowflake effect, $S_2-S_1$ will sometimes be different from T.

Observe that if $T=S_2$ for authentication to be valid, the new biometric print B matched with the two biometric templates $B_1$ and $B_2$ obtained during enrollment. $S_1$ is the transformation computed by matching authentication template or print B with template or print $B_1$. $S_2$ is the transformation map computed by matching authentication template B with $B_2$. Since the matches are good, despite the snowflake effect, T is close to $S_2-S_1$; otherwise, a valid authentication would not have occurred. (See FIG. 6.)

In an embodiment, biometric templates (prints) $B_1$ and $B_2$ are stored on the device in an encrypted or obfuscated format. In an embodiment, $h(V, S_2-S_1+\Delta)$ is computed for some values $\Delta$. The computer instructions compute $\Delta$ such that $\Phi^{e+1}(h(V, S_2-S_1+\Delta))$ equals the U that is stored in memory. This indicates to the security system that with high probability $h(V, S_2-S_1+\Delta)$ is the same as K. In an embodiment, this enables a person's identity to create a key, code or user credential K without storing K on the device.

In an embodiment, one biometric template (print) $B_1$ is stored on a device. In these embodiments, during authentication a transformation T is constructed that matches authentication template B with stored template $B_1$. In these embodiments, during enrollment (setup), biometric template (print) $B_2$ was obtained and was used to create transformation S from biometric $B_1$ to biometric $B_2$. Similar to as described above, during enrollment U is derived from transformation S and stored in the memory of the device. In an embodiment, during authentication, the computer program instructions compute $\Delta$ such that $\Phi^{e+1}(h(V, T \cdot \Delta))$ equals the U that is stored in memory of the device. In an embodiment, during authentication, the computer program instructions compute $\Delta$ such that $(D^{e+1}(h(V, T \cdot \Delta))$ equals the U that is stored in memory of the device where · indicates a composition of transformation and $\Delta$ is close to the identity transformation. In an embodiment, during authentication, the computer program instructions search for $\Delta$ such that $\Phi^{e+1}(h(V, \Delta \cdot T))$ equals the U that is stored in memory of the device where · indicates a composition of transformations and $\Delta$ is close to the identity transformation on the space of biometric templates (prints) or patterns. In an embodiment, during authentication, the computer program instructions search for $\Delta$ such that $\Phi(h(V, \Delta \cdot T))$ or $\Phi(V, \Delta \cdot T))$ or $h(V, \Delta \cdot T))$ or $\Phi(h(V, T \cdot \Delta))$ or $h(V, T \cdot \Delta))$ or $\Phi(V, T \cdot \Delta)$ equals U.

In these embodiments, the use of only one biometric $B_1$ stored on the device, may help hinder attempts to guess the key, code or user credentials. In these embodiments, biometric $B_2$ is used during enrollment but not stored on the device after enrollment is completed. In an embodiment, this enables a person's identity to create a key, code or user credential K without storing K on the device.

In these embodiments, the identity of the user mathematically brands the device or chip inside the device with the user's identity so that it is difficult to guess or derive the key, code or some confidential user credential. In an embodiment, the confidential user credential could be or contain some biometric or other information that is unique to the person who has access to (owns) the device.

If the one-way function or method of $\Phi$ is a 1 to 1 function, the probability of a collision is 0%. For current one-way hash functions that are approved by the NSA or NIST, $\Phi$ is close to being 1 to 1. This property is generally considered desirable in a one-way method or hash function. In cryptography, this is sometimes referred to as function $\Phi$ has a low probability of having collisions.

In the small chance that there is a collision, for small $\Delta$, for all $\Delta$ such that $U^v=\Phi^{e+1}(h(V, S_2-S_1+\Delta))$ then each prospective $K=h(V, S_2-S_1+\Delta)$ can be checked to see if it can decrypt the data or open access. This is one method for resolving collisions. In these computation, the value of K and U depend on transformation difference $S_2-S_1$. In these computations, the value of K and U depend on "something that is known" V. In this computation, the value of K and U depend on transformation $\Delta$ which is close to the identity transformation.

As shown in FIG. 6, in an embodiment the transformations may have the relationship $S_2=T \circ S_1$ or $S_2 \approx T \circ S_1$. The symbol $\circ$ denotes the composition of the transformation $S_1$ followed by the transformation T and the symbol $\approx$ means that $S_2$ and $T \circ S_1$ are equal or close to being the same. If $S_1$ is an invertible transformation, then transformation difference $S_2 \circ (S_1)^{-1}$ (which equals or is close to T) may be computed in order to help generate an invariant. In other embodiments that use transformation difference $S_2 \circ (S_1)^{-1}$, the derivation of the invariant may depend on transformation difference $S_2 \circ (S_1)^{-1}$. In an embodiment, the derivation of the invariant may depend on "something that is known" V. In an embodiment, the derivation of the invariant may depend on the transformation difference and depend on "something that is known". In other embodiments, the derivation of the invariant may depend on one or more transformations and depend on "something that is known".

PROTECTING IDENTITY WITH DYNAMIC CODES In these embodiments, a person's identity is protected with dynamic codes. A passcode P is determined so that it is dependent on information that is not stored permanently on the device. In an embodiment, this device may be a mobile phone. In an embodiment, this can be accomplished so that it is mathematically intractable to calculate the next one-time passcode P even if the attacker reverse engineers the current dynamic identity G and reverse engineers the proprietary algorithm(s) executing on the security device.

Protecting Identity with Dynamic Codes Enrollment
In an embodiment, there are two separate items that are computed during enrollment and then securely transmitted to the administrator. One item is called an external invariant w. In an embodiment w may be derived as $w=\Phi(h(V, T))$. In an embodiment, w may be computed as $w=\Phi(\Phi(V*T))$ where * represents concatenation. In still other embodiments where only a biometric factor is used, w can be computed as $w=\Phi(\Phi(T))$ or $w=\Phi(h(T))$. In some embodiments where only "what you know" is used as a factor, w may be computed as $w=\Phi(\Phi(V))$ or computed as $w=\Phi(h(V))$.

In embodiments where the external invariant w is transmitted to the administrator, the value $U=\Phi(w)$ may be stored on a mobile device which the person possesses. In an embodiment, this device is a mobile phone. In an embodiment where two or more factors are used, then a numeric conversion function a may be applied to the Passphrase, Password or PIN. In other words, let V denote the Passphrase, Password or PIN, then $\alpha(V)$ is a positive integer. In an embodiment, the function $\alpha$ is chosen so that $e=\alpha(V)$ is large enough such that it takes about one second to compute on the $\Phi^e$ on the chip in the mobile security device where biometric and cryptographic computations take place. This may help with mathematically intractability in a reverse engineering situation. In these embodiments, $U=\Phi^e(w)$ is stored on a chip in the mobile device where biometric and cryptographic computations are executed on this chip.

In an embodiment, the first dynamic identity G may be computed on the mobile security device and administrator as $G=\Phi(R)$. In other embodiments, the first dynamic identity G may be computed as $\Phi^k(w)$ where k is some positive integer. The second item is the identity code R. There are number of different ways to compute an unpredictable R. We explain how to do this in a broader context of creating a code or key C. C may represent a identity code, a cryptography key, Generating Keys and Codes with Hash Functions There are different methods that may be used for hashing iris prints, face prints, collections of fingers, hand prints, fingerprints and other kinds of input such as passphrases, passwords, PINS, visual pictures, names. As an alternative to biometric data, the input to a hashing function can even be another code.

Different types of methods of hashing are appropriate for different sizes of keys and codes, and different types of biometric print information that is passed to the hash function. One method is to take two different biometric prints and apply a hash function $\Phi$ to each print. As the method shown here is independent of the particular one-hash function, the symbol $\Phi$ denotes a one-way hash function whose output value is m bits. In an embodiment, $\Phi$ is the hash function SHA-512 and m=512 bits. In an embodiment, $\Phi$ one of the one-hash functions described previously.

Each application of $\Phi$ to one or more biometric print(s) or a subsection of a biometric print produces an output value of m bits. With two biometric prints, these bits are concatenated together to create a 2m-bit code, called C. Another method is to use two different sections $S_1$ and $S_2$ of a single acquired biometric prints, and produce a 2m-bit key or code, C, by concatenating $\Phi(S_1)$ and $\Phi(S_2)$.

This can be used to create codes larger than 2m bits long. Divide one or more acquired biometric prints into n sections: $S_1, S_2, \ldots, S_n$. Then concatenate the bits $\Phi(S_1), \Phi(S_2), \ldots, \Phi(S_n)$. This creates a code C that is 2 mn bits in length. For example, if the acquired biometric print is divided into 10 sections and m=1024, then this method would create a code with 10,240 bits. In another embodiment, with 10,240 bits for the code C, then compute $C=\Phi(S_1) \oplus \Phi(S_2) \ldots \oplus \Phi(S_n)$ where $\oplus$ represents the exclusive- or operation.

Depending on the size of the identity code R, the biometric prints obtained during enrollment can be divided into sections. If a m bit identity code R is to be obtained, then in an embodiment, $R=\Phi(S_1) \oplus \Phi(S_2) \ldots \oplus \Phi(S_n)$ is useful to compute an unpredictable R. In other embodiments that use two factor authentication, R may be computed as $R=\Phi(V) \oplus \Phi(S_1) \oplus \Phi(S_2) \ldots \oplus \Phi(S_n)$.

Secure Transmission

In an embodiment, R and w are securely transmitted to the administrator. In an embodiment, the Elliptic Curve Cryptography is used to encrypt the identity code R and an external invariant w and securely transmit them to the administrator. In an embodiment, R and w may be given directly to the administrator in the same physical place, such as at a bank, or the identity code may be mailed or electronically transmitted to the administrator if enrollment is accomplished remotely.

User Identity Creating a Code for Authentication

After a valid authentication occurs, Step 0.) the user module sends a request—that includes the user module's user ID and a number m indicating which passcode to submit—to the administrator. In an embodiment, the user module utilizes ECC cryptography to encrypt this request and send to the administrator.

Step 1.) The administrator receives the passcode request and with user_id retrieves the orbit number L(user_id) of the last passcode received from this particular user with user_id. If m>L(user_id), then in one embodiment, the admin sends a request back to the user module for passcode with orbit number n such that n>m. In an embodiment, the admin utilizes ECC cryptography to encrypt this request and send back to the user module.

In an embodiment, if m≤L(user_id), then the administrator terminates the authentication and access request. In an embodiment, error checking is used to make sure m was not changed on its route to the administrator. In an embodiment, the administrator sends an error back to the user module.

Step 2.) The user module receives the request to compute passcode with index number n. These steps are executed in the secure module of the mobile security device.

Step 1.) The dynamic identity G and U are retrieved from a secure non-volatile memory.

Step 2.) Let $S_1$ be the transformation map between the biometric template just authenticated and the first encrypted one retrieved from flash; let $S_2$ be the transformation map between the biometric template just authenticated and the second encrypted one retrieved from flash. On the mobile security device, compute the transformation map difference, $S_2-S_1$, and then $Z=\Phi^{e+1}(h(V, S_2-S_1))$.

Step 3.) A range of $Z_\Delta$ values are tested whereby nearby values close to $S_2-S_1$ denoted as $S_2-S_1+\Delta$ are chosen. This means $Z_\Delta=\Phi^{e+1}(h(V, S_2-S_1+\Delta))$ is computed and compared to U in memory. In this computation, the value of $Z_\Delta$ depends on transformation difference $S_2-S_1$. In this computation, the value of $Z_\Delta$ depends on "something that is known" V. In this computation, the value of $Z_\Delta$ depends on transformation $\Delta$ which is close to the identity transformation.

If $U=Z_\Delta$, for this $\Delta$, then the next one-time passcode is computed as $P=\Phi(h(V, S_2-S_1+\Delta)*G)$ where * represents concatenation. In other embodiments where w is computed as $w=\Phi(V*T))$ then value $Z_\Delta=\Phi^{e+2}(V*(S_2-S_1+\Delta))$ is computed for each small value of $\Delta$.

Step 4.) The dynamic identity G is changed to a new value. G is set equal to the new value f(G), where there are an infinite number of functions that f could be. The function f will be referred to as the perturbing function. One possible perturbing function f could add $\Phi(G)$ to G. Another possible perturbing function f could add 1 to G and permute the order of the symbols in G using some randomly chosen permutation. f could be a function constructed from a dynamical system.

Step 5.) In an embodiment, the one-time passcode P may be submitted directly to the administrator. Or during Internet or wireless transmission, P can be encrypted with ECCA for additional security to hinder a "capture and resubmit" attack.

Passcode Verification By The Administrator The following steps are executed by the administrator:

Step 1.) The administrator receives the passcode P and the user id I from the user.

Step 2.) The user id I is used to retrieve the corresponding dynamic identity G and external invariant w from a database, a hash function $\Phi$ is applied to w*G, denoted as $\Phi$(w*G), and $\Phi$(w*G) is compared to P.

Step 3.) During one comparison, if $\Phi$(w*G) equals P, then the passcode submitted by the user is valid, and the dynamic identity is set equal to a new value f(G), where f is one of the perturbing functions discussed above.

Reducing User Error and Hindering Replay Attacks

If a user is reading the one-time passcode from a display, sometimes the user may incorrectly read it or write it down. Or the user may forget to record the one-time password, or type it into a keyboard incorrectly. In other embodiments, the one-time passcode may be transmitted wirelessly, but there is a transmission error. Or the Internet service is malfunctioning.

In any of these cases, the user may repeat authentication, and compute a new one-time passcode. When this happens, an optional feature enables the administrator to accept this new passcode even though the administrator is expecting to receive the next passcode.

The administrator works around user error by executing the following steps: Step 1.) The administrator receives the passcode P and the user id I from the user.

Step 2.) The administrator uses I to retrieve the dynamic identity $G_I$ and the corresponding external invariant $w_I$. The administrator computes with a one-way hash function $\Phi$ the value $\Phi(w*G_I)$, and compares it to P.

Step 3.) If $\Phi(w*G_I)$ does not equal P, a temporary dynamic identity $G_T$ is set equal to $f(G_I)$, where f is the perturbing function.

Initialize the counter k to zero. Then execute the following loop at most m times:

Step A.) The administrator compares $\Phi(w*G_T)$ to passcode P.

Step B.) If $\Phi(w*G_T)$ is not equal to P, set $G_T$ equal to $f(G_T)$. Increment k. If (k<m), go back to step A. If (k≥m), then send a message that the passcode P is not valid.

Step C.) Otherwise, $\Phi(w*G_T)$ equals P. For user I, set the new value of the dynamic identity equal to $f(G_T)$. Then passcode P is valid and enable access.

In an embodiment, a timestamp can be associated with a one-time passcode. If the current time is later than the associated timestamp, when the passcode is submitted to the administrator, then this one-time passcode has expired. In this case, the passcode is invalid. Consequently, the administrator would deny access for this particular passcode submitted.

Transformations Between Biometric Templates & Prints

In an embodiment, a feature matching method may be used for deriving one or more transformations between biometric prints (templates) during enrollment (setup) and these one or more transformations help generate an invariant based on the biometric prints or templates. In an embodiment, a feature matching method is executed during authentication. In an embodiment, a feature matching method may be used for deriving one or more transformations between biometric prints (templates) during biometric authentication and these one or more transformations help generate an invariant based on the biometric prints or templates. In an embodiment, a transformation difference computed from one or more transformations may help derive an invariant.

In some cases, the feature matching method may not only help improve the average quality of the originally enrolled biometric print images, but may also serve to reduce an individual's FRR during authentication. The feature matching method may use any of a number of techniques to ensure that a good quality image has been acquired by the sensor. In one embodiment, two distinct biometric print images obtained during enrollment can be considered of good quality if their matching score is above a certain threshold. A sufficiently high matching score qualifies these biometric prints as valid enrollment images for the purpose of matching a biometric print sensed at a later time when requesting access. (A description of features is given below.) Two biometric prints obtained during enrollment which do not have a sufficiently high matching score may be discarded. In an embodiment, a biometric print obtained during enrollment with at least a minimum number of features that match corresponding features from a distinct biometric print obtained during enrollment, may be considered of good quality and subsequently stored. In an embodiment, this good quality is based on different transformations being close enough so that an invariant can be generated based on the transformation(s). In an embodiment, the transformation difference between transformations is close to the identity transformation so that an invariant can be generated based on one or more transformations.

In an embodiment, stored biometric print information obtained during enrollment is used for comparison against a biometric print obtained during authentication.

Figure 1:
FIG. 1 shows a portion of a biometric print with two white rectangles, marking features.
Figure 2:
FIG. 2 shows a portion of a fingerprint with two white rectangles, marking features, and a white line connecting the white rectangles to aid in ridge and valley counting.
Figure 3:
FIG. 3 shows a portion of a fingerprint with a white rectangle, marking a core feature of a fingerprint.
Figure 4:
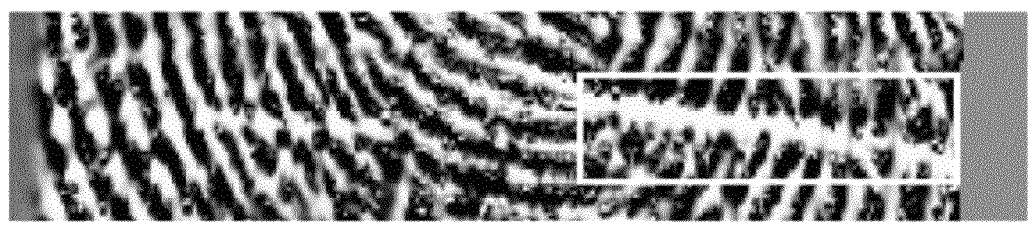
FIG. 4 shows a portion of a fingerprint with a white rectangle, marking a cut feature.

The word "feature" may be used to denote a valley ending or a valley bifurcation. The white rectangle at the bottom and left part of FIG. 1 surrounds a valley ending and the white box above it and slightly to the right surrounds a valley bifurcation. We also use the word "feature" to denote any noteworthy structure in the biometric print. A feature may be a sweat pore. A feature may be the number of valleys between two other features. In FIG. 2, there are three valleys between the valley bifurcation feature and a sweat pore feature. These features are surrounded by white rectangles and connected by a white horizontal line segment. A feature may be more abstract such as the average curvature of the biometric print in a local region of the biometric print. A feature may be the core of the biometric print. In FIG. 3, a white rectangle surrounds the core. A feature may be a valley that is within a certain distance or number of valleys from the core of the biometric print. A feature may be a cut across the biometric print. In FIG. 4, a white rectangle surrounds a cut feature.

A feature may also be a cross-foliation of a biometric print. A cross-foliation may represented by a starting pixel point, (x, y, θ)=(120, 58, 90°) with orientation and a finite sequence such as [−1, −1, −1, 1, 1, 1, 1, 1, 1, −1, −1, −1, −1, 1, 1, 1, 1, 1, 1]. The number 120 is the x-coordinate of the first pixel and the number 58 represents the y-coordinate. The last coordinate, 90°, indicates the direction of the cross-foliation. In the standard trigonometry of the unit circle, 90°, points up along the y-axis. Consequently, pixel (120, 58) is labeled with −1, pixel (120, 57) is labeled with −1, pixel (120, 56) is labeled with −1, pixel (120, 55) is labeled with 1, pixel (120, 54) is labeled with 1, and so on. (To avoid confusion, observe that in bitmap coordinate systems, the y-coordinates sometimes decrease as you move up along the y-axis. This is the opposite of what is taught in high school Algebra.) Each −1 indicates that the corresponding pixel is in a biometric print valley and each 1 indicates that the corresponding pixel is on a biometric print ridge. The length of a finite sequence may range from 10 pixels to greater than 200 pixels, depending on parameters such as the resolution of the sensor, the resolution of the pre-processing of enhanced image, speed of the processor, and so on.

In addition, a feature may be a crossover, which is a structure on the biometric print where two valleys cross each other. A feature can also be a loop, which is a valley that curves at least as much as a horseshoe shape. The loop can even be a complete loop and curve as much as a circle. A loop is sometimes near the core of the biometric print. A complex feature is two or more features or simple features composed together. In addition to simple features, complex features can also be matched between two biometric prints.

FIG. 10 shows an embodiment where a feature can be part of the shape of the nose or the whole nose. In an embodiment, a feature can be the color of a particular location in the left eye. Another feature can be the average color in the left cheek. Another feature can be the shape of the lips or the mouth. Another feature may be the color of a region of the face.

In an embodiment, a feature can be the location of lines in the hand or the shape of the lines in the hand as shown in FIG. 9. In an embodiment, a feature can be the distance from the hinge of the index finger to an intersection of lines in the palm of the hand.

In an embodiment a feature may be a shape in the iris as shown in FIG. 8. A feature may be a collection of shapes in the iris. A feature may be the distance between two features identified in the iris. Another feature may be the color(s) in a geometric shape in the iris. In an embodiment, these color(s) may be represented as a collection of frequencies and amplitudes.

In FIG. 7, a feature may be the hinge of the ring finger. A feature may be the hinge of the middle finger. A feature may be the distance between the hinge of the ring finger and the hinge of the middle finger. A feature may be the distance between the tip of the little finger and the hinge of the ring finger. A feature may be the shape of the top of the index finger. A feature may the relative lengths of fingers.

In regard to notation, the x and y coordinates of a feature p are denoted as $p(x)$ and $p(y)$ and the orientation of a feature is denoted as $p(\theta)$. When a subscript is used for the feature, then we use $p_1(\theta)$. The distance between two features is denoted as $D(p_1, p_2)$. In an embodiment, there may be a z coordinate and the coordinate of the feature p is denoted as $p(z)$.

In regard to matching collections of features on a print, the goal is to find a transformation that best matches corresponding features between two different biometric prints. A locally affine transformation is a rotation by $\theta$, followed by (function composition) a translation by the vector $(a, b)$. A locally affine transformation from a region of biometric print A to a region of biometric print B is shown in FIG. 5. In FIG. 5, the locally affine transformation from the top region of the biometric print to the bottom region of the biometric print is $(a, b)=(-83, -764)$ and the rotation $\theta=30$ degrees. A translation is a function of the form $T_{(a,b)}(x, y)=(x+a, y+b)$. A rotation is a function $R_\theta(x, y)=(x \cos \theta - y \sin \theta, x \sin \theta + y \cos \theta)$. A locally affine transformation in the plane is the composition of a rotation and a translation $T_{(a,b)}R_\theta(x, y)=(a+x \cos \theta - y \sin \theta, b+x \sin \theta + y \cos \theta)$.

Consequently, a locally affine transformation T may be represented by the three parameters $(a, b, \theta)$ and a region A. An affine transformation may be computed starting with one subset of features $\{p_1, p_2, p_3, \ldots, p_s\}$ selected from a biometric print and comparing them to another subset of features $\{q_1, q_2, q_3, \ldots, q_s\}$ selected from a distinct biometric print. In an embodiment, s is two, but s may be larger.

Below are some embodiments with s=2. The parameters of the transformation T are computed so that $F(p_1)=q_1$ and $F(p_2)=q_2$ Solving for $T=(a, b, \theta)$. Example 1: $p_1=(0, 0)$, $p_2=(0, 1)$, $q_1=(3, 2)$, $q_2=(2, 2)$. $\theta_p$=arctangent$(p_2(x)-p_1(x), p_2(y)-p_1(y))$= arctangent$(0, 1)=90°$. $\theta_q$=arctangent$(q_2(x)-q_1(x), q_2(y)-q_1(y))$=arctangent$(0, -1)=180°$. $\theta=\theta_q-\theta_p=90$ degrees. In example 1, $R_\theta(p_1)=(0, 0)$ and $R_\theta(p_2)=(-1, 0)$. The average translation is: $(a, b)=(q_1-R_\theta(p_1)+q_2-R_\theta(p_2))/2$. Then $(a, b)=0.5*[(q_1(x)-R_\theta(p_1(x)), q_1(y)-R_\theta(p_1(y))+(q_2(x)-R_\theta(p_2(x)), q_2(y)-R_\theta(p_2(y)))]=0.5*[(3, 2)+(3, 2)]=(3, 2)$.

Example 2: $p_1=(0, 0)$, $p_2=(3, 4)$, $q_1=(-1, 4)$, $q_2=(-6, 4)$. $\theta_p$=arctangent $(p_2(x)-p_1(x), p_2(y)-p_1(y))$=arctangent$(3, 4)=53.13°$. $\theta_q$=arctangent $(q_2(x)-q_1(x), q_2(y)-q_1(y))$=arctangent$(-5, 0)=180°$. $\theta=\theta_q-\theta_p=(180°-53.13°)=126.87°$. In example 2, $R_\theta(p_1)=(0, 0)$ and $R_\theta(p_2)=(-5, 0)$. The average translation is $(a, b)=(q_1-R_\theta(p_1)+q_2-R_\theta(p_2))/2=0.5*[(q_1(x)-R_\theta(p_1(x)), q_1(y)-R_\theta(p_1(y))+(q_2(x)-R_\theta(p_2(0), q_2(y)-R_\theta(p_2(y)))]=0.5*[(-1, 4)+(-1, 4)]=(-1, 4)$.

Example 3: $p_1=(0, 0)$, $p_2=(-3, -2)$, $q_1=(1, 2)$, $q_2=(3, 5)$. $\theta_p$=arctangent $(p_2(x)-p_1(x), p_2(y)-p_1(y))$=arctangent$(-3, -2)=213.69°$. $\theta_q$=arctangent $(q_2(x)-q_1(x), q_2(y)-q_1(y))$=arctangent$(2, 3)=56.31°$. $\theta=\theta_q-\theta_p=(56.31°-213.69°)$ $32-157.38*=202.62°$. In this example, $R_\theta(p_1)=(0, 0)$ and $R_\theta(p_2)=(2, 3)$. The average translation is $(a, b)=(q_1-R_\theta(p_1)+q_2-R_\theta(p_2))/2$. Thus, $(a, b)=0.5*[(q_1(x)-R_\theta(p(x)), q_1(y)-R_\theta(p_1(y))+(q_2(x)-R_\theta(p_2(x)), q_2(y)-R_\theta(p_2(y)))]=0.5*[(1, 2)+(3-2, 5-3)]=(1, 2)$.

In an embodiment, the following feature pair conditions may help in feature matching.

Angle conditions after solving for transformation $T=(a, b, \theta)$:
The angles match—meaning they are almost the same:

$$|p_i(\theta)+\alpha-q_j(\theta)|<\delta_\theta \text{ and } |p_k(\theta)+\alpha-q_l(\theta)|<\delta_\theta \quad 1.)$$

Distance conditions after solving for $(a, b, \theta)$:
The distances match—meaning they are almost the same.

$$D(T(p_i), q_j)<\delta_1 \quad 2.)$$

$$D(T(p_k), q_l)<\delta_2 \quad 3.)$$

$$|D(p_i, p_k)-D(q_j, q_l)|<\delta_{12} \quad 4.)$$

In an embodiment, $\delta_1=\delta_2$. In an embodiment, $\delta_{12}=2\delta_1$ In an embodiment, where the biometric print has valleys, a valley count condition after solving for $(a, b, \theta)$ is the following. The valley counts match—meaning they are the same or almost the same.

$$|V(p_i, p_k)-V(q_j, q_l)|<N_V \quad 5.)$$

The notation $V(p_i, p_k)$ denotes the number of valleys between features $p_i$ and $p_k$. For example, in FIG. 2, when the white regions denote valleys, then the number of valleys between the two features surrounded by white rectangles and connected by a white straight line is four (4 valleys). The valley count condition means that that the number of valleys between two corresponding pairs of features should be about the same. In some cases, $N_V$ may not stay constant and may depend on the distance between the features $p_i$ and $p_k$ Below is an embodiment describing computer instructions that search feature pairs and compute transformations for matching feature pairs.

Suppose K is the number of transformations T to store.

---

For a feature_pair $(p_i, p_k)$ selected from $\{p_1, p_2, \ldots, p_m\}$
{

-continued

```
For a feature pair (q_j, q_l) selected from {q_1, q_2, ..., q_n} and
satisfying one or more or all of the angle conditions, distance
conditions and valley count conditions (one or more of conditions
1, 2, 3, 4, 5)
{
    if ( feature p_i and q_j match well and the feature types of p_k and q_l
        match well)
    {
        compute a transformation T such that T(p_i) = q_j and T(p_k) = q_l
            if it has not already been computed
        compute the matching score of T (see details below).
        store T if its matching score is one of the top K scores and remove
            the transformation with the lowest matching score
    }
    else if ( feature types of p_i and q_l match well and the feature types of
            p_k and q_j match well
        )
    {
        compute transformation T such that T(p_i) = q_l and T(p_k) = q_j
            if it has not already been computed
        compute the matching score of T (see details below).
            store T if its matching score is in one of the top K and remove the
            transformation with the lowest matching score
    }
}
}
```

As mentioned before, in an embodiment an affine transformation may be used. An affine transformation may be described by three parameters, $(a, b, \theta)$. Two affine transformations $T=(a_1, b_1, \theta_1)$ and $G=(a_2, b_2, \theta_2)$ are close if the three inequalities hold:

$$|a_1 - a_2| < \delta_a$$

$$|b_1 - b_2| < \delta_b$$

$$|\theta_1 - \theta_2| < \delta_e$$

where $\delta_a$, $\delta_b$, and $\delta_e$ are small positive constants. The value of $\delta_a$, $\delta_b$, and $\delta_e$ may depend on the dimensions of the biometric print images, and the likelihood that an image could be distorted by a strange placement or sweeping of the finger on the sensor. $\delta_a$, $\delta_b$ may range from 1 to 6 and $\delta_e$ may range from 5 degrees to 40 degrees.

In an embodiment, from these K best transformations, the largest number of these transformations that are close is chosen. The composite biometric match score S may be computed by summing these matching scores.

If (S>match score authentication threshold) accept authentication biometric print else reject authentication biometric print. As an example, if the number of these transformations is five and their respective matching scores are 208, 125, 102, 91 and 234. Then S=208+125+102+91+234=760. If the "match score authentication threshold" is 600, then the biometric print submitted during authentication is accepted. In an alternative embodiment, the scores may multiplied. The parameter "match score authentication threshold" is chosen based on the requirements of the application and the quality of the data. For example, the "match score authentication threshold" may be larger in a military application versus for a person gaining access to their ITunes account.

In an embodiment randomness may be used to select feature pairs which helps compute transformations between biometric prints or templates. In this case, not all of the feature pairs may be searched. This may be useful when execution speed is important, or to help address false minutiae. In an embodiment, the processor may be less expensive: in an embodiment, a smart card chip may be used. In one embodiment, the method randomly selects some of the feature pairs, so that the maximum number of pairs In one embodiment, set Z=the maximum number of feature pairs. The value of Z places an upper bound on the amount of computation that is performed.

In an embodiment, computer instructions initialize a collection of distinct random numbers $\{r_1, r_2, \ldots, r_Z\}$ such that each $0 \leq r_i < Z$ and $r_i \neq r_k$ when $i \neq k$. In some cases a random number may be used to generate $\{r_1, r_2, \ldots, r_Z\}$ In this alternative, the computation is the same as the computation shown previously except the features chosen from $\{p_1, p_2, \ldots, p_m\}$ are selected using the random numbers $\{r_1, r_2, \ldots, r_Z\}$.

In an embodiment, each biometric print may be separated into local regions. In this case, a different local transformation may be computed between each pair of corresponding regions in biometric print (template) A and biometric print (template) B. In these embodiments, local transformations match corresponding features between two biometric prints, because sometimes biometric print images suffer from translational and rotational deformations. These deformations can be a result of environmental factors such as the index of refraction of light, temperature changes, moisture changes. These deformations can be a result of the geometry and placement or orientation of the body part such as fingers, fingerprint, iris, face or hand. These deformations can be a result of changes in the biometric sensor. And in some cases some of these factors may contribute to deformations in the biometric print or template that is acquired. In an embodiment, the transformation between biometric templates is a collection of locally affine transformations over different regions of the biometric print.

The invention claimed is:

1. A machine comprising:
   a processor system with at least one processor; and
   a memory system with one or more machine readable media,
   the machine readable media storing thereon one or more instructions, which when executed cause the processor system to implement a method including at least acquiring two sets of user identifying data, via different acquisitions;
   transforming, by the processor system, the user identifying data, the transforming including at least a mapping of one of the two sets of user identifying data onto another of the two sets of user identifying data,
   calculating, by the processor system, an invariant from one or more transformations of the user identifying data, the transforming of the user identifying data being a result of the one or more transformations, the invariant being a relationship between two objects that, within a tolerance determined prior to authentication, does not change under the one or more of the transformations between the two objects, and
   generating by the processor system, an authentication key based on the invariant.

2. The machine of claim 1 wherein said invariant is a cryptography key.

3. The machine of claim 1 wherein said invariant is a user credential or code.

4. The machine of claim 2 wherein said cryptography key encrypts a financial transaction.

5. The machine of claim 1 wherein said computation is executed in a secure area of a processor.

6. The machine of claim 1 wherein each of the two sets of user identifying information includes a biometric template or a biometric print, and said one or more transformations are between two biometric templates or biometric prints of the two sets of user identifying information.

7. The machine of claim 1 wherein each of the two sets of user identifying information includes a non-biometric pattern, and said one or more transformations are between two or more non-biometric patterns of the user identifying information.

8. The machine of claim 1 wherein the method further includes at least authenticating a user associated with the user identifying information and the authenticating includes at least the transforming, by at least performing said one or more transformations.

9. The machine of claim 8 wherein said authenticating includes at least authenticating biometric data associated with the user.

10. The machine of claim 9 where said biometric data includes at least fingerprints.

11. The machine of claim 9 wherein the authenticating of the biometric data includes at least recognizing a voice.

12. The machine of claim 8 where the biometric data includes at least biometric data derived from two or more fingers.

13. The machine of claim 9 wherein said one or more transformations include at least one affine transformation.

14. The machine of claim 8 wherein the authenticating includes at least matching one or more features of one of the two sets of user identifying data with one or more features of another of the two set of user identifying data, and the calculating of said one or more transformations including at least deriving the one or more transformations from steps performed as part of the matching of the one or more features.

15. The machine of claim 14 wherein said matching of the one or more features includes at least matching a pair of features from one of the two sets of user identifying data with a corresponding pair of features from another of the two sets of user identifying data, and the matching of the air of features includes at least matching a relationship between a first feature of the pair of features and a second feature of the pair of features.

16. The machine of claim 14 wherein at least one feature of the one or more features is a fingerprint ridge or a valley ending or a ridge bifurcation or a valley bifurcation.

17. The machine of claim 15 wherein said matching of feature pairs includes at least computing of a distance between features.

18. The machine of claim 14 wherein at least one feature of the one or more features is derived from more than one finger.

19. The machine of claim 1 wherein said transforming includes at least transforming one or more patterns.

20. The machine of claim 19 wherein said patterns are color patterns or geometric patterns.

21. The machine of claim 19 wherein the method further comprises authenticating a user by at least said transforming.

22. The machine of claim 19 wherein said invariant is derived from said transforming of the color patterns, and the transforming of the color patterns includes at least transforming one color pattern of one of the two sets of user identifying information to match another of color pattern of another of the two sets of user identifying information.

23. The machine of claim 19 wherein at least one of said patterns contains at least one image recognizable by a person.

24. The machine of claim 23 wherein said image is a dog.

25. The machine of claim 19 wherein noise or randomness are added to said one or more patterns prior to the transforming.

26. The machine of claim 19 wherein said derivation uses a one-way method or one-way function one or more times.

27. The machine of claim 1 wherein
the method further includes at least computing a transformation difference from at least said one or more transformations, the transformation difference being a difference between two transformations, a first transformation of the two transformations being between a first subset of user identifying data of a first of the two sets of user identifying data and a second subset of user identifying data of the second of the two sets of user identifying data and a second transformation of the two transformations being a transformation between the first subset of user identifying data and a third subset of user identifying data, the third subset of user identifying data being a subset of the second set of user identifying data.

28. The machine of claim 27 wherein the method further includes at least deriving said invariant from at least the transformation difference.

29. The machine of claim 27 wherein the method further includes at least deriving said invariant from at least something that is known to a user.

30. The machine of claim 27 wherein
the method further includes at least deriving the invariant from at least the transformation difference;
applying a one-way method or one-way function at least once to said invariant.

31. The machine of claim 30 wherein the deriving of the invariant from at least the transformation difference includes deriving the invariant from at least something that is known in addition to deriving the invariant from the transformation difference, such that the invariant to which the one-way method or one-way function is applied depends on said transformation difference and depends on something that is known.

32. The machine of claim 1 wherein the generating of the authentication key includes at least applying a one-way method or one-way function one or more times to the invariant.

33. A machine-implemented method comprising:
acquiring two sets of user identifying data, each set of user identifying data being acquired at a different time,
transforming, by a machine system, the user identifying data, the transforming including at least applying one or more transformations to the user identifying data, each transformation being a mapping of one set of user identifying data of the two sets of user identifying data onto another set of user identifying data of the two sets of user identifying data, the machine system including at least a processor system having one or more processors and a memory system, and
calculating, by the processor system, an invariant from the one or more transformations the invariant being a relationship between two objects that, within a tolerance determined prior to authentication, does not change under transformations between the two objects, where one of the two objects is associated with one of the two sets of user identifying data and another of the two objects is associated with another of the two sets of user identifying data.

34. The method of claim 33 wherein said invariant is at least one of the following: a cryptography key, a code or a user credential.

35. The method of claim 34 wherein the method further comprises securing a financial transaction by at least encrypting the financial transaction with said cryptography key or code or user credential.

36. The method of claim 33 wherein said transformations are computed in a secure area of a processor.

37. The method of claim 33 wherein each of the two sets of user identifying information includes a biometric template or a biometric print, and said one or more transformations are between biometric templates or biometric prints of the two sets of identifying information.

38. The method of claim 33 wherein each of the two sets of user identifying information includes a non-biometric pattern, and said one or more transformations are between two or more non-biometric patterns of the user identifying information.

39. The method of claim 35 wherein the method further comprises authenticating a user associated with the user identifying information and the authenticating includes at least the transforming, by at least performing said one or more transformations.

40. The method of claim 38 wherein said authenticating includes at least authenticating biometric data associated with the user.

41. The method of claim 40 where said biometric data includes at least fingerprints.

42. The method of claim 40 wherein the authenticating of the biometric data includes at least recognizing a voice.

43. The method of claim 40 wherein the biometric data includes at least biometric data derived from two or more fingers.

44. The method of claim 40 wherein said one or more transformations include at least one affine transformation.

45. The method of claim 40 wherein the authenticating includes at least matching one or more features in said biometric data, and generating said one or more transformations based at least on the matching of the one or more features.

46. The method of claim 45 wherein said matching of the one or more features includes at least a matching pair of features from one of the two sets of user identifying information with a corresponding pair of features from another of the two sets of user identifying data, and the matching of the pair of features includes at least matching a relationship between a first feature of the pair of features and a second feature of the pair of features.

47. The method of claim 45 wherein at least one feature of the one or more features is a fingerprint ridge or valley ending or a ridge bifurcation or a valley bifurcation.

48. The method of claim 46 wherein said matching of feature pairs includes at least computing a distance between features.

49. The method of claim 48 wherein at least one feature of the one or more features is derived from more than one finger.

50. The method of claim 33 wherein each set of two sets of user identifying data including one or more patterns, and said transforming including mapping the one or more patterns of one of the two sets of user identifying data to one or more patterns of the other set of user identifying data.

51. The method of claim 50 wherein said patterns are color patterns or geometric patterns.

52. The method of claim 50 further comprising authenticating a user by at least performing the transforming.

53. The method of claim 51 wherein the calculating of said invariant is based on the mapping between color patterns or geometric patterns.

54. The method of claim 50 wherein at least one of said patterns contains at least one image recognizable by a person.

55. The method of claim 54 wherein said image is a dog.

56. The method of claim 50 further comprising adding noise or randomness to said one or more patterns.

57. The method of claim 54 wherein the calculating of the invariant includes at least applying a one-way method or one-way function one or more times to the one or more transformations.

58. The method of claim 33 further comprising computing a transformation difference from said one or more transformations, the transformation difference being a difference between two transformations, a first transformation of the two transformations being between a first subset of user identifying data of a first of the two sets of user identifying data and a second subset of user identifying data of the second of the two sets of user identifying data and a second transformation of the two transformations being a transformation between the first subset of user identifying data and a third subset of user identifying data, the third subset of user identifying data being a subset of the second set of user identifying data.

59. The method of claim 58 wherein the calculating of said invariant includes at least deriving the invariant from at least said transformation difference.

60. The method of claim 58 wherein the calculating of said invariant includes at least deriving the invariant from at least something that is known to a user.

61. The method of claim 59 further comprising applying a one-way method or one-way function at least once to the transformation difference, and said invariant depends on said transformation difference.

62. The method of claim 61 wherein said invariant depends on said transformation difference and depends on something that is known.

63. The method of claim 33 wherein said derivation includes at least applying a one-way method or one-way function at least one time.

64. A method comprising performing a biometric authentication by a machine system having a processor system and memory system including at least one processor, the authentication including at least
    acquiring as part of the authentication a first set of biometric data including at least a first biometric print;
    determining, by a processor, a first set of one or more transformations that transforms the first biometric pattern of the first set of biometric data to a second biometric pattern of a second set of biometric data that is stored in the memory system;
    determining, by the processor, a second set of one or more transformations that transforms the first biometric pattern of the first set of biometric data to a third biometric print, the third biometric pattern being a biometric pattern of the second set of biometric data that is different than the second biometric print, the third biometric pattern being stored in the memory system;
    the second set of biometric data having been acquired during an enrollment process in which the user enrolls in the machine system;
    computing a transformation difference from the first set of one or more transformations and the second set of one or more transformations, therein generating the transformation difference from the biometric authentication, the transformation difference being a transformation that computes a difference between results of the first set of one or more transformations and results of the second set of one or more transformations;
    deriving, within a tolerance determined prior to authentication, an invariant from the transformation difference;
    applying a one way method or one-way function at least once to said invariant therein forming an authentication key that depends on the transformation difference generated from the biometric authentication; the one way method being a method for which computing an inverse is intractable and the one way function being a function for which computing an inverse is intractable.

65. A method comprising performing a biometric authentication by a machine system having a processor system and memory system including at least one processor, the authentication including at least determining, by the processor system, a first set of one or more transformations that transforms a first security pattern to a second security pattern;

determining, by the machine system, a second set of one or more transformations that transforms the first security pattern to a third security pattern;

determining, by the machine system, an inverse of the second set of one or more transformations;

computing, by the machine system, a third transformation that transforms results from the first set of one or more transformations to results of the second set of one or more transformations;

deriving, by the machine system, within a tolerance determined prior to authentication, an invariant from the third transformation;

applying, by the machine system, a one way method or one-way function at least once to user data that includes at least the invariant therein forming a security code; the one way method being a method for which computing an inverse is intractable and the one way function being a function for which computing an inverse is intractable.

66. The method of claim 65, the tolerance being smaller than the invariant;

further comprising:

matching, by the machine system, the security code computed by the applying, by searching variations of a stored version of the invariant that are within the tolerance determined prior to authentication for a match to the security code computed.

67. The method of claim 66, the method further comprising:

determining whether a match resulted from a collision, where the match resulting from the collision is a match resulting from applying a one way function to a different set of data than the user data; the determining whether a match resulted from a collision including at least testing whether variations of the security code are effective for an intended purpose of the security code.

68. The method of claim 65, the deriving of the invariant including at least computing an inverse of the second set of transformations; and computing a composite transformation from the first set of transformations and the inverse of the second set of transformations; and deriving the invariant from the composite transformation.

69. The method of claim 65, the deriving of the invariant including at least computing a difference between the first set of transformations and the second set of transformations.

70. The method of claim 64, the security pattern being a biometric pattern.

* * * * *